United States Patent [19]

Wu et al.

[11] Patent Number: 4,972,328
[45] Date of Patent: Nov. 20, 1990

[54] INTERACTIVE KNOWLEDGE BASE END USER INTERFACE DRIVEN MAINTENANCE AND ACQUISITION SYSTEM

[75] Inventors: Harry C. Wu, Waltham; Hansel H. Wan, Billerica; Cho-Kwan Yau, Malden, all of Mass.

[73] Assignee: Bull HN Information Systems Inc., Billerica, Mass.

[21] Appl. No.: 286,568

[22] Filed: Dec. 16, 1988

[51] Int. Cl.⁵ ............................................. G06F 15/18
[52] U.S. Cl. ..................................... 364/513; 364/192
[58] Field of Search ............... 364/513, 300, 188-190, 364/191-193

[56] References Cited

U.S. PATENT DOCUMENTS

| | | | |
|---|---|---|---|
| 4,658,370 | 4/1987 | Erman | 364/513 |
| 4,675,829 | 6/1987 | Clemenson | 364/513 |
| 4,752,889 | 6/1988 | Rappaport | 364/513 |
| 4,752,890 | 6/1988 | Natarajan et al. | 364/513 |
| 4,754,409 | 6/1988 | Ashford et al. | 364/513 |
| 4,760,519 | 7/1988 | Papworth | 364/200 |

Primary Examiner—Allen MacDonald
Attorney, Agent, or Firm—Faith F. Driscoll; John S. Solakian

[57] ABSTRACT

A knowledge base system includes separate expert user and end user interface facilities which communicate with the system's inference engine and knowledge base. Linking means operatively interconnect the expert user facility to the end user interface facility enabling the simulation of the end user environment while the knowledge base is being concurrently edited or modified. Such simulation is carried out by placing the end user interface facility in an edit mode of operation during which the user can stop at any point. In response to a single keyboard command, an expert user can switch control back to the expert user facility to a point within the knowledge base selected relative to the context of the operation which was being run thereby facilitating the maintenance and updating of the knowledge base.

16 Claims, 22 Drawing Sheets

| FRAME | COMPUTER | |
|---|---|---|
| | parent: ROOT children: MAINFRAME, MINI, MICRO slots | |
| | TYPE | CHOICES (MAINFRAME, MINI, MICRO PRINT-NAME ("TYPE") |
| | PRODUCT-LINE | CHOICES-RULESET (FIND-PRODUCT-LINE) PRINT-NAME ("PRODUCT LINE") |
| | MODEL | |
| | CPU | |
| | MEMORY-SIZE | PRINT-NAME ("MEMORY SIZE") |
| | DISK-SIZE | PRINT-NAME ("DISK SIZE") |

| FRAME | MINI | |
|---|---|---|
| | parent: COMPUTER children: DPS6-90, DPS6-95 slots: | |
| | TYPE | VALUE (MINI) |
| | MEMORY-SIZE | CHOICES (2MB, 4MB, 6MB, 10MB, 12MB, 14MB, 16MB) |

| FRAME | DPS6-90 | |
|---|---|---|
| | parent: MINI children: DPS6-91, DPS6-92 slots: | |
| | PRODUCT-LINE | VALUE (DPS6-90) |
| | MODEL | CHOICES (DPS6-91, DPS6-92) |

| FRAME | DPS6-91 | | |
|---|---|---|---|
| | parent: slots: | DPS6-90 | |
| | | MODEL | VALUE (DPS6-91) |
| | | MEMORY-SIZE | CHOICES (10MB, 12MB, 14MB, 16MB) DEFAULT (16MB) |

| FRAME | MICRO | | |
|---|---|---|---|
| | parent: children: slots: | COMPUTER XP, AP, SP | |
| | | TYPE | VALUE (MICRO) |

| FRAME | SP | | |
|---|---|---|---|
| | parent: children: slots: | MICRO SP-1, SP-2, SP-3 | |
| | | PRODUCT-LINE | VALUE (SP) |
| | | MODEL | CHOICES (SP-1, SP-2, SP-3) |
| | | MEMORY-SIZE | CHOICES (2MB, 4MB, 8MB, 16MB) |

| FRAME | SP-3 | | |
|---|---|---|---|
| | parent: slots: | SP | |
| | | MODEL | VALUE (SP-3) |

| FORM | FORM-1 | | |
|---|---|---|---|
| | parent:<br>slots: | ROOT-FORM | |
| | | X-COORDINATE | VALUE (2) |
| | | Y-COORDINATE | VALUE (3) |
| | | WIDTH | VALUE (40) |
| | | HEIGHT | VALUE (10) |
| | | ITEM-LIST | RULESET (FIND-FORM-1-ITEM-LIST) |
| | | NEXT-FORM | FORM (FORM-2) |

| FORM | FORM-2 | | |
|---|---|---|---|
| | parent:<br>slots: | ROOT-FORM | |
| | | X-COORDINATE | VALUE (4) |
| | | Y-COORDINATE | VALUE (10) |
| | | WIDTH | VALUE (20) |
| | | HEIGHT | VALUE (5) |
| | | ITEM-LIST | LIST (((COMPUTER [PRODUCT-LINE]<br>[MODEL], MEMORY-SIZE),<br>(COMPUTER [PRODUCT-LINE]<br>[MODEL], DISK-SIZE))) |

*Fig. 6c.*

| RULESET | FIND-PRODUCT-LINE: |
|---|---|
| | IF COMPUTER [TYPE] = MAINFRAME<br>THEN LIST (DPS80, DPS90)<br>END |
| | IF COMPUTER [TYPE] = MINI<br>THEN LIST (DPS6-90, DPS6-95)<br>END |
| | IF COMPUTER [TYPE] = MICRO<br>THEN LIST (XP, AP, SP)<br>END |

| RULESET | FIND-FORM-1-ITEM-LIST: |
|---|---|
| | IF TRUE<br>THEN LIST ((COMPUTER, TYPE)<br>(COMPUTER, PRODUCT-LINE),<br>(COMPUTER [PRODUCT-LINE],<br>MODEL))<br>END |

*Fig. 6d.*

INTERACTIVE KNOWLEDGE BASE END USER INTERFACE DRIVEN MAINTENANCE AND ACQUISITION SYSTEM

BACKGROUND OF THE INVENTION

1. Field of Use

The present invention relates to knowledge based systems and more particularly to systems for updating and maintaining the knowledge components of such systems.

1. Prior Art

As is well known, knowledge based tools are being used to speed up the development of expert systems. Such tools include expert system software stripped of its knowledge component or base which leaves only a shell or the linguistic and reasoning mechanisms that interpret and draw conclusions from knowledge.

The procedure for building an expert system with such tools involves employing the tool's development engine which includes editor and debugging tools to build a knowledge base of facts and rules for solving a specific type of problem. The knowledge base is then tested on sample problems using the tool's inference engine which includes the rule and program interpreter software components. The knowledge base is corrected using the editor and debugging tools. When testing is completed, the development engine is removed and copies of the tested knowledge base and the inference engine, collectively termed "production environment" are distributed to end users.

An important consideration in the use of such tools is the quality of the user and developer (expert) interfaces. If the tool is difficult to utilize, experts may not find it acceptable. Some tools require familiarity with the underlying languages to update and maintain the knowledge base.

To facilitate updating, some tools have provided facilities to examine an expert's line of reasoning. One system disclosed in U.S. Pat. No. 4,752,889, which issued on June 21, 1988, provides a display of rule and object networks. The system includes browsing capabilities which enable all of the relationships between an object and its sub-objects and their properties in addition to the logical links between rules to be examined. Other systems include tracing facilities to provide lists of rules that were invoked to reach the system's conclusion.

Also, to make the knowledge base easier to understand and access, knowledge of a particular domain is represented by frames. A frame system is a network of nodes and relations organized in a hierarchy in which the topmost nodes represent general concepts and the lower nodes represent more specific instances of those concepts. In such a system, the concept at each node is defined by a collection of attributes and values of those attributes. The attributes are called slots and each slot can have procedures or programs associated or attached to it which are executed when the information contained in the slots or values of the attribute is changed.

For certain applications, a frame type representation is used in an object-oriented organization consisting of objects rather than concepts that represent entities having distinct properties or behavior characteristics. Each object is situated in a network hierarchy that lets it inherit the properties of higher level objects just as in inheritance takes place in the frame based system of representation In this type of system, all objects communicate with one another by sending and receiving messages. When an object receives a message, it consults its data base and rules to decide what action to take. The rules may be stored directly with the object or in a higher level object somewhere in the network hierarchy. Usually, the action involves sending new messages to other objects in the system.

The advantage of the above type of organizational representation or structure is that it shortens the time required for the system to search for a specific rule or fact. That is, there is no need to search through the entire base knowledge for information about specific object or entity. Also, the structure saves space since common data can be shared.

While the above arrangement has made such systems easier to use, the expert user is still required to know in advance where to look or how to locate the specific knowledge which is to be modified. To the extent that the expert user does not know where the specific knowledge is located, the expert user is required to browse or search the knowledge base. This requires additional time and certain difficulty. Also, even with this capability, expert users still must be able to recognize when they have found the desired information when they see it.

To facilitate operation, one recent system was designed to incorporate a feature which enables a user to press two function keys and jump directly to the rule line to be edited from a screen encountered during normal system operation. While this arrangement facilitates correction, it is based on a one-to-one correspondence between the rule being executed and the location of the rule within the knowledge base. Thus, the feature is not useful in knowledge base systems which are organized in an hierarchical fashion and use inheritance. For further information regarding this system, reference may be made to the publication entitled, "CRYSTAL" by Intelligent Environments, copyright 1987.

Accordingly, it is a primary object of the present invention to provide a knowledge base tool which utilizes a frame based representation and is easy to operate and maintain.

It is a further object to provide a system which minimizes the amount of time required to make and verify changes made to a frame based knowledge base.

SUMMARY OF THE INVENTION

The above and other objects of the present invention are achieved by an expert system which includes separate expert user and end user facilities to communicate with the system's inference engine and knowledge base. Knowledge within the knowledge base is represented in terms of frames. The two facilities are linked together by means which an expert user can invoke at any time during an operating session by means of a single keyboard selection. This allows the expert user to simulate the end user environment while the knowledge base is undergoing editing.

In the preferred embodiment, such simulation is carried out by placing the end user interface facility in an edit mode of operation during which system operation can be stopped at any point. The expert user can switch control back to the expert user facility by initiating a command through the use of a special key to the exact point within the knowledge base where the expert user wants to make a desired change or modification.

The preferred embodiment of the present invention includes means for generating signals representative of a number of choices or selections in response to each such command. The choices generated are related in a predetermined manner to the context of the operation being performed by the system. By making a desired choice during the edit mode of operation, an expert user can cause the system to switch control back to the exact point where the change is to be made concerning a particular frame or attribute as a function of the choice made.

The above facility is integrated within the expert system so as to be completely transparent to the normal end user mode of operation. This facilitates maintenance of the system and distribution of the updated system particularily when the system is used on personal computer systems.

It will be appreciated that the expert user still has the normal options of printing out or tracing the rule by rule execution of the system in addition to being able to browse through the knowledge base. The capability of the present invention which establishes direct communication with the inference engine through the end user facility enables the expert user to examine and access any part of the system including any internal information stored by the inference engine which may be changed from session to session. These capabilities are all provided with easy to understand menus which additionally saves time.

The novel features which are believed to be characteristic of the invention both as to its organization and method of operation, together with further objects and advantages, will be better understood from the following description when considered in connection with the accompanying drawings. It is to be expressly understood, however, that each of the drawings is given for the purpose of illustration only and is not intended as a definition of the limits of the present invention.

BRIEF DESCRIPTION OF THE DRAWINGS

FIGS. 6a through 6d show in greater detail, the frame organization of the knowledge base 10-12.

FIGS. 7a through 7c show the sequences of form objects according to the present invention.

DESCRIPTION OF THE PREFERRED EMBODIMENT

Figure 1:
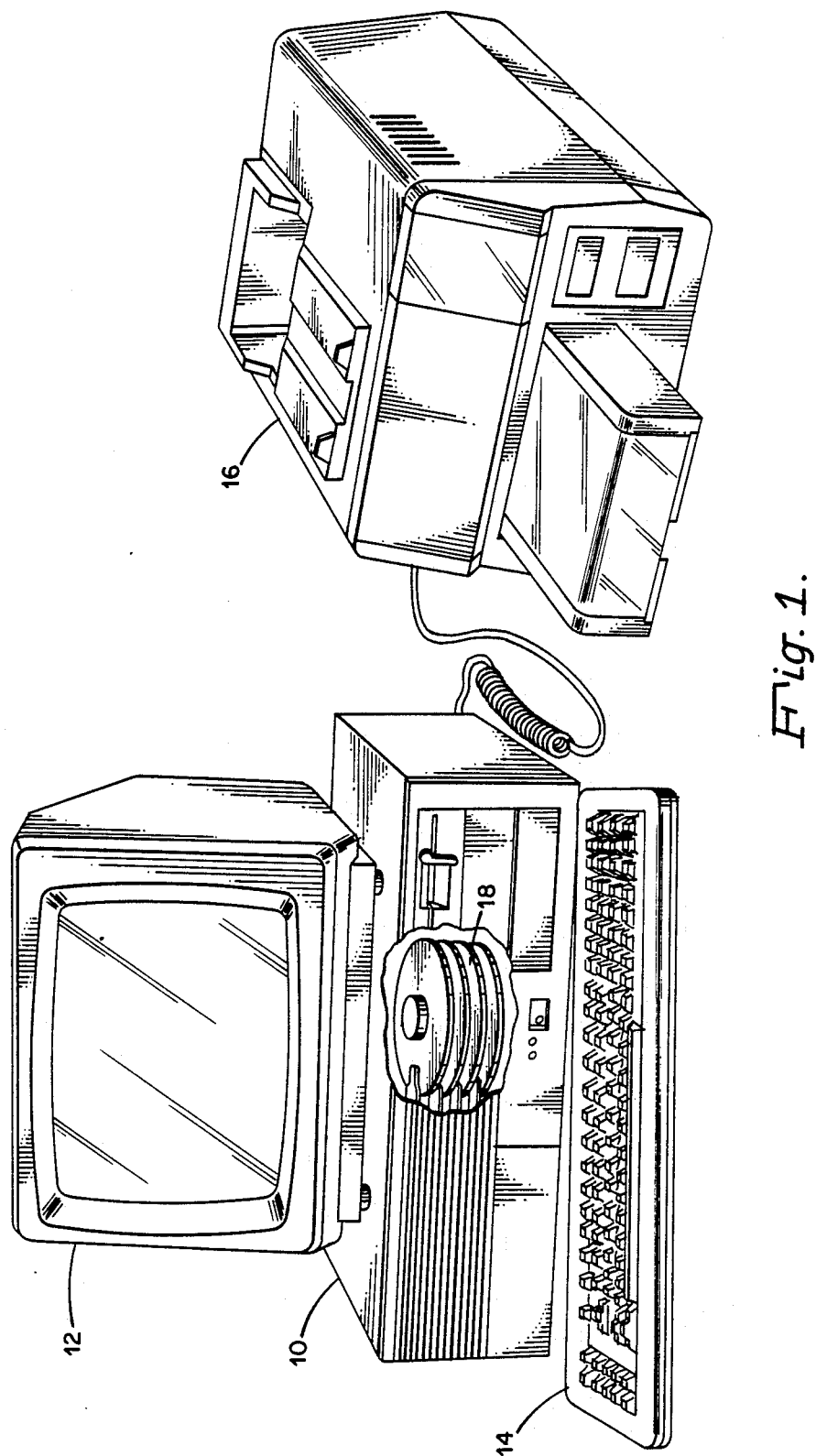
FIG. 1 shows the components of the system.

The expert system which incorporates a preferred embodiment of the present invention resides on a conventional personal computer, such as the personal computer 10 of FIG. 1 which is equipped with a cathode ray tube (CRT) display monitor 12 for showing the expert user intermediate results or menu prompts for entering selections via a keyboard 14 as shown. Additionally, the personal computer connects to a printer 16 to provide a permanent record or listing of rules or data according to the present invention.

The different programs and data which make up the components of the expert system of the preferred embodiment are loaded into the main memory of the computer as needed from hard disk 18. The components are integrated and interconnected so as to enable an expert user to operate the expert system 10 in both user and edit modes of operation. As explained herein, this organization allows the expert user to switch between modes of operation thereby reducing the amount of time required to edit and verify any changes made to the knowledge base during the performance of maintenance and upating operations.

Figure 2A:
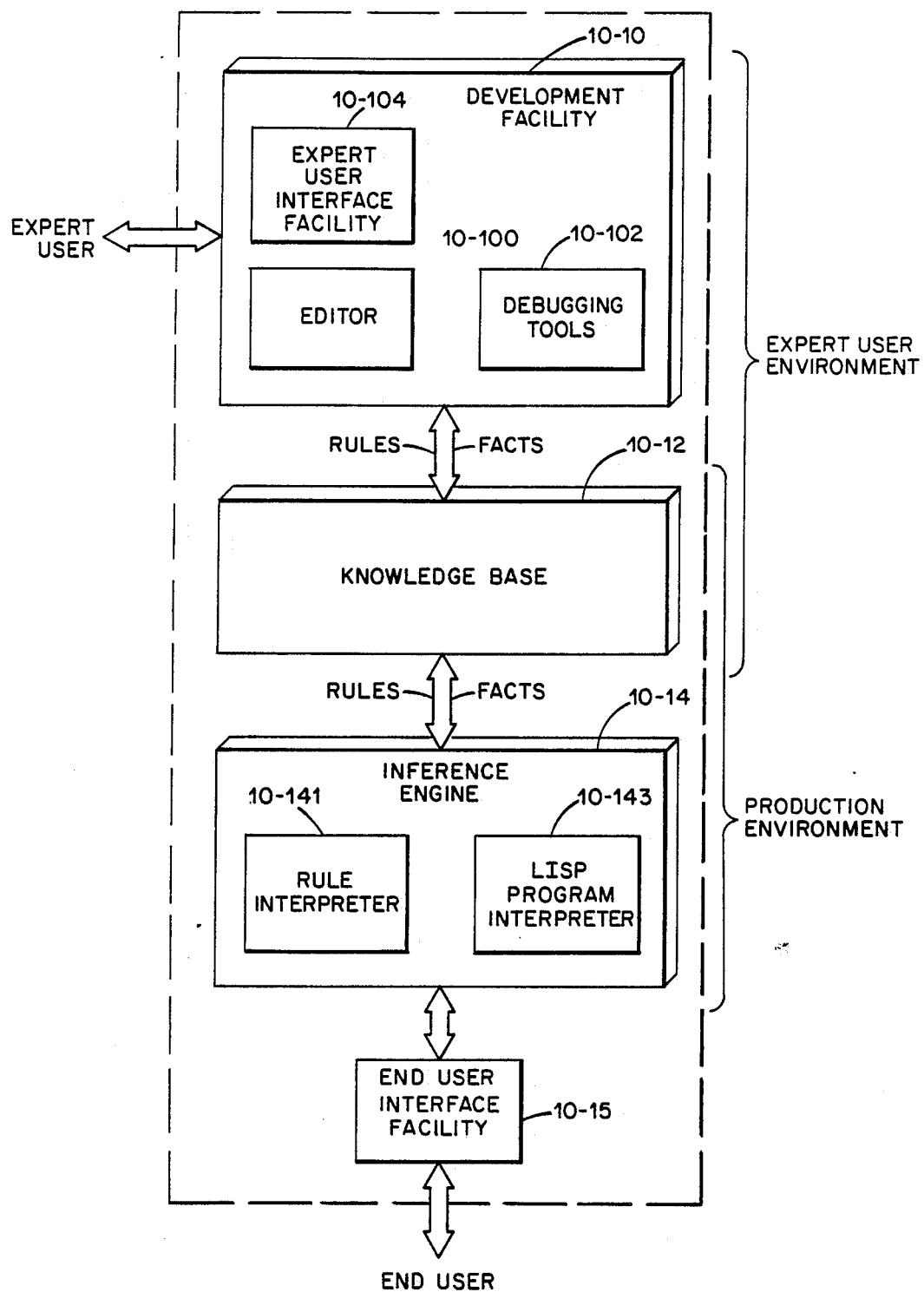
FIGS. 2a and 2b are block diagrams illustrating the different modes of operation according to the present invention.

FIG. 2a depicts the major components of a type of expert system which incorporates the teachings of the present invention. As seen from FIG. 2, the expert system includes expert user facilities which are included in the development facility block 10-1, a knowledge base 10-12, and an inference engine 10-14 and end user facilities included in block 10-15. As seen from the Figure, the inference engine 10-14 includes a rule interpreter 10-141 and a LISP program interpreter 10-143. The inference engine 10-14 operates on the knowledge base 10-12 to develop a desired conclusion or response. In the present embodiment as explained in greater detail herein, the knowledge base 10-12 uses object descriptions represented by frames organized in hierarchical structures which allows the frames to inherit information from the frames above them.

The rule interpreter 10-141 is the part of the inference engine 10-14 that decides how to apply the knowledge about the problem domain. The domain knowledge is represented as sets of rules that are checked against a collection of facts or knowledge about the current situation. When the IF portion of a rule is satisfied by the facts, the action specified by the THEN portion is performed. When this happens, the rule is said to fire or execute.

The rule interpreter 10-141 compares the IF portions of rules with the facts and executes the rule whose IF portion matches the facts. The rule's action may modify the set of facts in the knowledge base, for example, by adding a new fact. The matching of rule IF portions to the facts can produce "inference chains" which indicate how the system used the rules to reach a conclusion. Inference chains can be displayed to help explain how the system reached its conclusions.

In the present embodiment, the rules are grouped into rulesets which are attached to various slots in a frame. This mechanism is called procedural attachment. Evaluation starts with the data or set of facts which is then matched with the antecedent conditions in each of the relevant rules to determine the applicability of the rule to the current situation or object. This is termed IF-THEN rules.

The LISP program interpreter 10-143 operates to execute subroutines required for carrying out required system operations (e.g. I/O, computations, etc.). As mentioned above, the knowledge base 10-12 stores the rulesets and facts that embody knowledge about a particular domain. The knowledge base is written in a frame structure as outlined above. For the purpose of the present invention, the inference engine 10-14 can be considered conventional in design. For example, it may be constructed similar to the inference engine included in the LOOPS system developed by Xerox Corporation.

As explained herein, the end user interface facilities 10-15 includes programs designed to allow the user to interact with the system. Comunication is carried out through the use of menu choices that allow the user to answer requests by the system for information.

As shown in FIG. 2a, the development engine or expert user facility 10-10 includes an editor facility 10-101 and debugging tool facility 10-102. These facilities help the expert user with the development or building of the knowledge base. The debugging tool facility 10-102 provides the expert user with the ability to list the rules fired or the names of the subroutines called during system testing after changes have been made. The editor facility 10-101 enables the expert user to edit the knowledge base 10-12. The editor performs syntax checking and knowledge extraction wherein the editor helps the expert user enter new knowledge into the system.

Figure 2B:
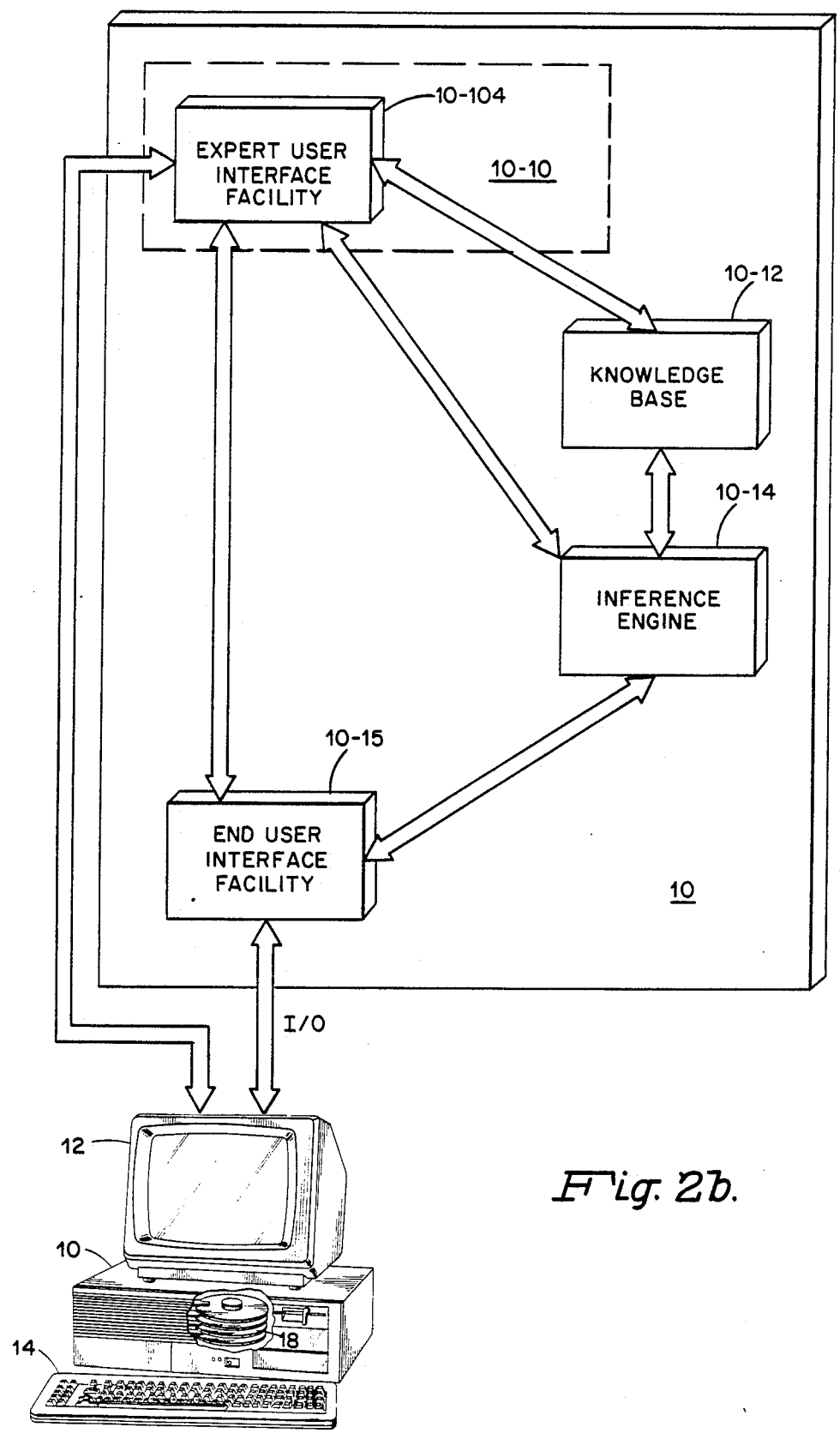
Figure 2B:
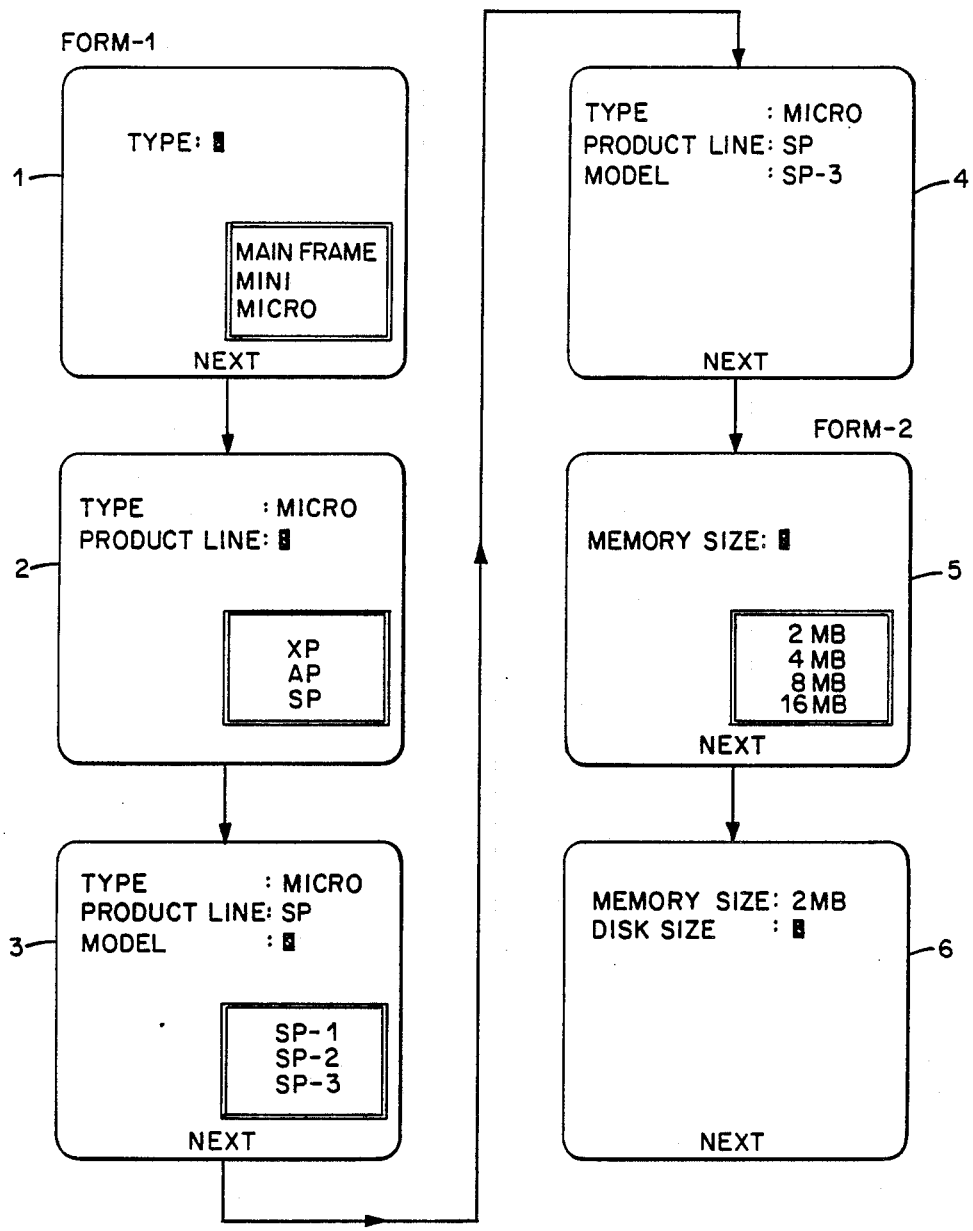

FIG. 2b illustrates in greater detail certain portions of the system of FIG. 2b, according to the teachings of the present invention. As mentioned, the development engine 10-10 further includes an expert user interface facility block 10-104 through which an expert user communicates with the knowledge base, the inference engine components of the system and the end user interface facility 10-15.

The end user interfaces with the inference engine 10-14 through an end user interface facility block 10-15. The block 10-146 presents questions and information to the end user and supplies end user responses to the inference engine 10-14. There is a requirement of frequent interaction between the system and an end user through "consultations" which include question and answering sessions, the presentation of conclusions, help-giving interchanges and error indications. The methods used to provide this interaction varies as a function of the type of system is dependent upon the type of computer hardware and operating system being used. In the present system, the application dependent code is isolated into separate modules which can be customized for different hardware or applications and all input/output routines which are normally included in the inference engine 10-14 have been removed and incorporated into the end user interface facility 10-15.

Thus, the end user interface facility 10-15 has the capability of performing all of the input and output functions previously processed internally with the inference engine 10-14. These functions include the following:

1. Display error messages received from the inference engine 10-14.
2. Present text and request keyboard input which must fall within a specified range and be of a specified data type.
3. Present text and request keyboard input which must be of one or more of a set of specified character strings.
4. Any values entered by the user must be received and interpreted by the end user interface facility 10-15.

Some responses are restricted to a set of possible legal answers while others are not. The user interface facility 10-15 checks all responses to ensure that they are of the correct data type and any responses that are restricted to a legal set of answers are compared against these legal answers. Whenever the end user enters an illegal answer, the end user interface facility 10-15 informs the end user that the answer was invalid and prompts the user to provide a correct answer.

According to the teachings of the present invention, means are provided which link or interconnect the expert user interface facility 10-104 and end user interface facility 10-15 together. As explained herein, this integrated arrangement enables the expert user to switch control between the two facilities in a manner which greatly expedites updating and maintenance operations. Before describing these facilities, the organization of knowledge base 10-12 will be described in greater detail.

KNOWLEDGE BASE 10-12

As mentioned previously, the knowledge of the domain in knowledge base 10-12 is represented in terms of "frames." The term "knowledge" refers to the combination of data structures and interpretative procedures which when performed by a computer will simulate human reasoning or "knowledgeable" behavior. The set of knowledge representations which describe a domain of knowledge is termed a "knowledge base." Unlike, a data base, the knowledge base can include executable procedures within a defined record termed herein a slot.

The term "descriptive knowledge" refers to the collection and classification of facts or information about a concept, object or entity which may be acted upon by a system. The basic units of descriptive knowledge are called frames. In the preferred embodiment of the present invention, each type of object is defined as a class and is represented by a "FRAME" in knowledge base 10-12. Each frame contains one or more slots or subclasses which give specific categories of objects or entities. The slots can have any number of facets or attributes corresponding to specific properties that can be used to modify its behavior. The facets can have any number of values.

The frame based representation was selected because it provides for an inheritance structure. This permits information to be stored at the most general node in a hierarchical data structure and yet still be triggered by any more specific situation or instance to which it applies.

In the preferred embodiment, frames are viewed as generalized property lists because there is room in a frame to specify more than property values and it is possible for a frame to inherit information from another related frame. The frames are represented as nested associated lists. For further information regarding how such lists may be implemented, reference may be made to the text entitled, "LISP Second Edition", by Patrick Henry Winston and Berthold Klaus Paul Horn, published by Addison-Wesley Publishing Company, 1984.

The procedural representation is mechanized by rulesets or structured reasoning procedures. These procedures reside within the slots of the frames and include the structural capability to make choices.

In the system of the present invention, a rule expression used takes the form of a premise-conclusion, that is, IF (condition) THEN (action) END. The END indicates to the system that the action specified after the word "THEN" should be performed if the condition specified after the word "IF" is satified. The term "RULESET" is a set of rules that define the same relationship. The system uses certain parameters for defining the information pertaining to the objects specified in the rulesets. At any time, on which it is working, the specific slot for which a value is being searched and its current value, if any. These parameters are FRAME, SLOT and VALUE.

DESCRIPTION OF END USER AND EXPERT USER FACILITIES 10-15 AND 10-104

End User Interface Facility User Mode

Figure 3:
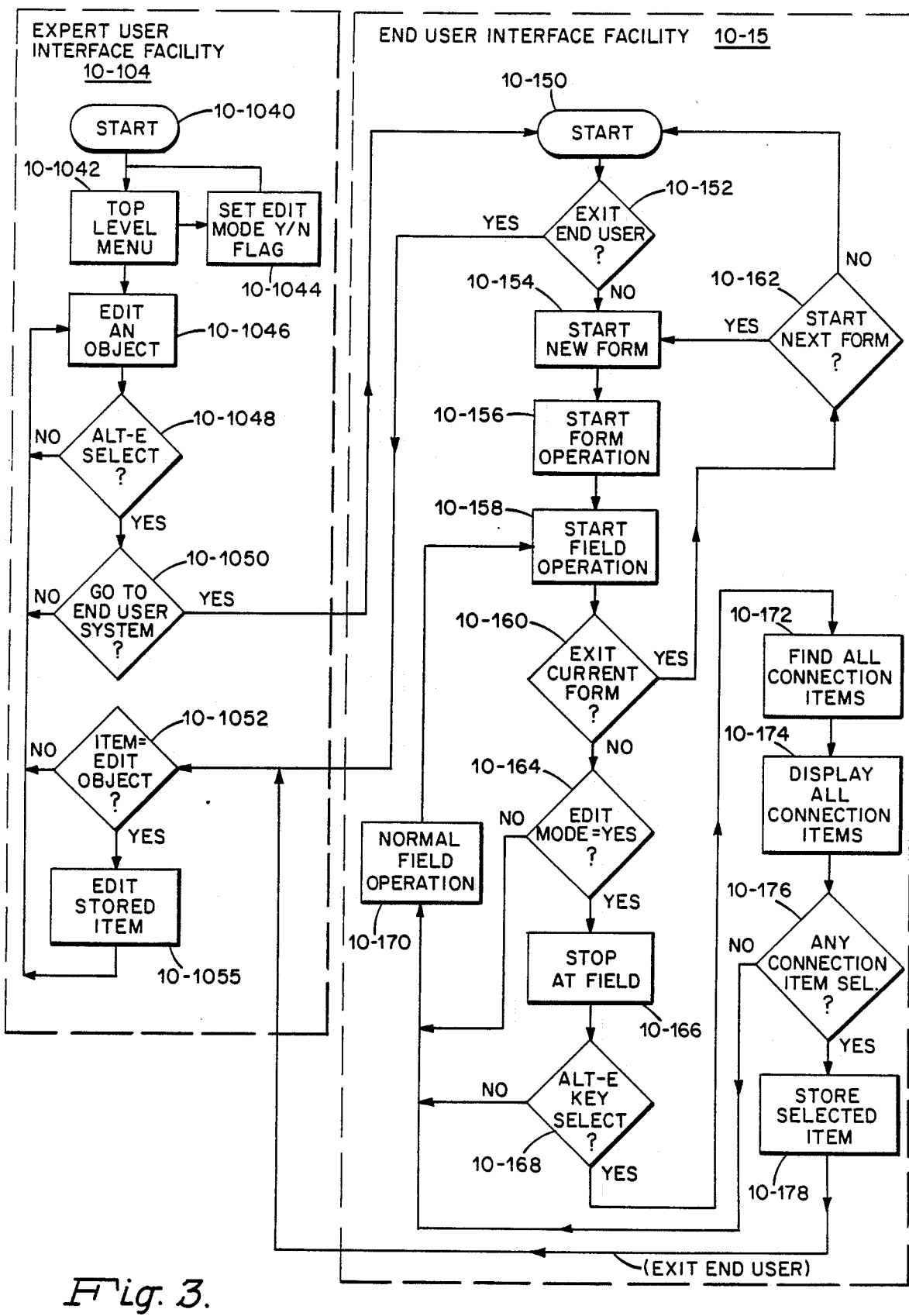
FIG. 3 is a flow chart showing the interactive mode of operation of the present invention.

FIG. 3 shows in greater detail, the different blocks or modules included within expert user interface facility 10-104 and end user interface facility 10-15. The end user communicates with the expert system via end user interface facility 10-15 through a sequence of forms and menus by entering the required information or making selections as appropriate. There are two kinds of forms displayed by the system. One is a menu form for displaying a list of items which the end user can position the cursor at any given item and press the <ENTER> key to select that particular item. The second type of form is termed an input form in which the list of items are input items. There is a corresponding input field for each particular item. Thus, each input form contains a list of questions and each question appears on the form with a label and input field.

Inference engine 10-14 establishes what questions are grouped together to form the input form and at each stage determines the set of questions which will be asked next. It sends those questions to the end user interface facility 10-15 to be displayed to the end user as an input form. The inference engine 10-14, based upon end user prior answers or selections, predetermines which of the next set of questions will the end user be allowed to provide input which is specifically defined by choices provided to the end user. That is, the end user is only able to move the cursor to those questions previously established as requiring end user input.

The above operation takes place when the system is placed in the user or run mode of operation which corresponds to start block 10-150. In user mode, the system sequences through blocks 10-152, 10-154, 10-156, 10-158, 10-160, 10-164 and 10-170. As mentioned, in the preferred embodiment, the end user interface facility 10-15 presents text and requests keyboard input which is selected from one of a set of specified choices. These choices are displayed a page or screen at a time. Each page, in turn, is linked to information stored in knowledge base 10-12 as explained herein.

The end user can sequence through each page or exit at any point as indicated by block 10-160. For each question of each page, there is a set of choices displayed in a window area located at the lower right-hand corner of the screen. As mentioned, the end user can only select one of the indicated choices and make no other selections. Thus, this is generally the type of interaction which takes place between the end user interface facility 10-15 and inference engine 10-14 when the system is running in normal end user mode.

End User Interface Facility Edit Mode

The end user interface facility 10-15 also includes blocks 10-164, 10-166 and 10-168 which enable an expert user to change or edit all of the menus or forms used by the end user in interacting with the system. In this manner, the expert user can customize the end user interface facility for different end user application. This capability is provided by separating out the input/output modules from the inference engine 10-14.

In greater detail, when the expert user selects a change user mode, the system switches to an alternate mode based upon the state of an edit mode flag set by block 10-1044 of the expert user interface facility 10-104. This allows the expert user to toggle or switch between the user or edit modes of operation of the end user interface facility 10-15 under the control of block 10-164. When the change use mode is toggled, the indication "edit mode" is displayed or erased at the upper right corner of the screen of the CRT monitor 12.

Figure 4:
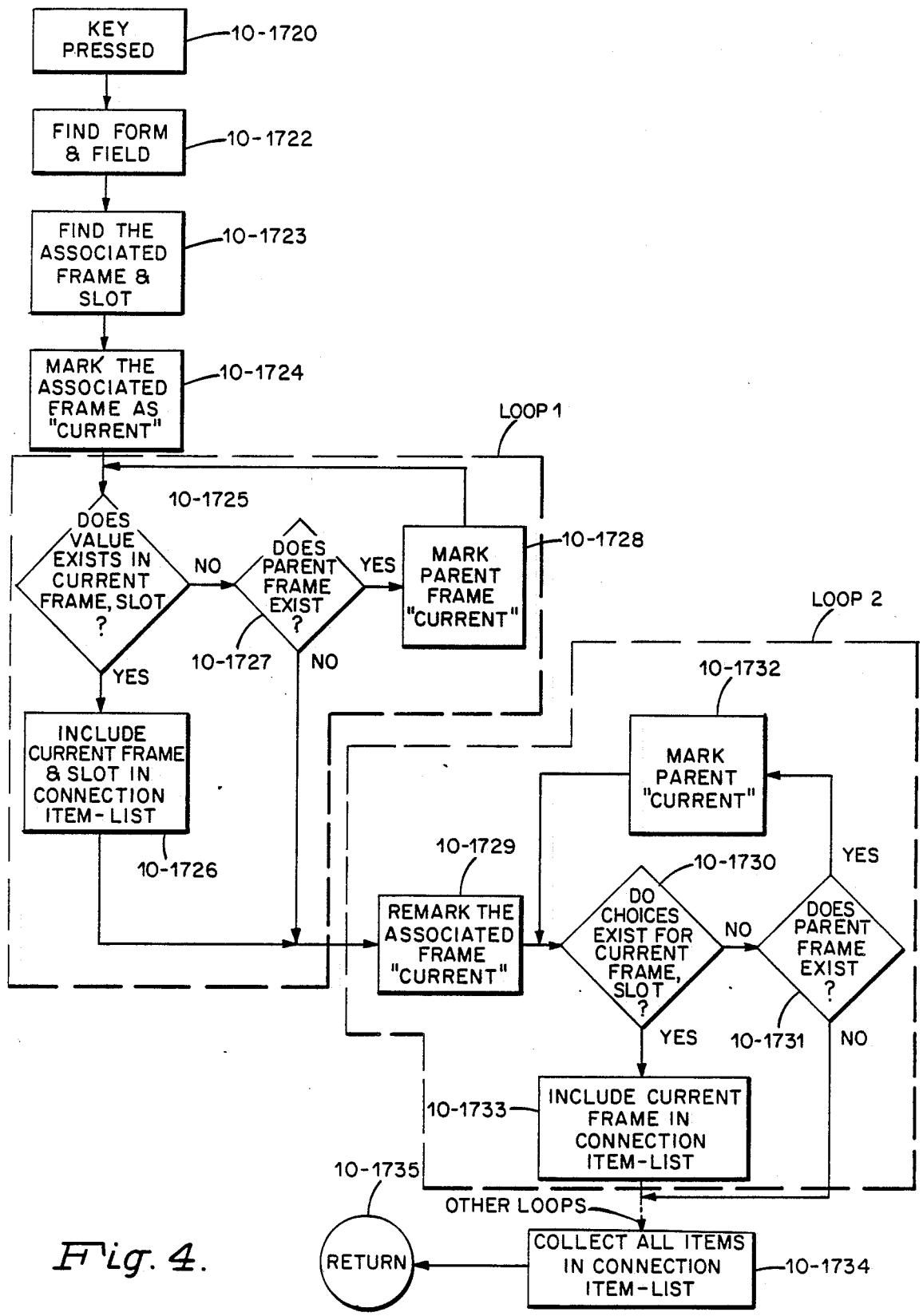
FIG. 4 is a flow chart showing the program sequences for switching modes according to the present invention.

As explained herein, when the expert user wants to add another choice to a question on an input form, the expert user presses the <ALT><E> keys on keyboard 14. This causes the end user interface facility 10-15 to sequence through blocks 10-172 through 10-178. This results in the system displaying a number of action items selectable by the expert user. By selecting one and pressing the <ENTER> key, the system switches control to block 10-1052 of the expert user interface facility 10-104. Thereafter, under control of block 10-1055, the system automatically displays the specific item frame within knowledge base 10-12 to be edited. FIG. 4 shows in greater detail, the blocks 10-1720 through 10-1735 which comprise block 10-172 of FIG. 3.

Expert User Interface Facility

As seen from FIG. 3, the expert user can edit specific frames within knowledge base 10-12, under the control of blocks 10-1040 through 10-1046. The formats of the screens that are generated for the expert user interface facility 10-104 are fixed by selecting an item within the window of the screen and pressing the <ENTER> key. The editor, in turn, causes a menu specifying the allowable operations performable on the item to be displayed. The expert user can perform a number of operations either on the frame itself (e.g. list its subclasses, add a slot) or on the frame's slots as explained herein.

Briefly, when the system is starting, block 10-1042 displays a top level menu which enables the expert user to determine the mode of operation for the system. Under the control of block 10-1044, the expert user can set the system to operate in the user mode or in the edit mode. To make modifications or additions to knowledge base 10-12, the expert user selects the applicable menu and choice within the top level menu. This causes the system under the control of block 10-1046 to open up a frame and enable the expert user to edit that frame. Also, under the control of block 10-1046, the expert user, by pressing the <ALT><A> keys, can cause a type-in window to be displayed for designating the name of the frame to be edited. By entering the frame name and pressing key <F10>, the system will place the expert user directly in the frame editor at a point corresponding to the frame name entered. If an incomplete name is entered, facility 10-104 will display a list of possible frames.

Under the control of block 10-1048, the system determines if the <ALT><E> keys have been pressed. If it has not been pressed, this indicates that the expert user is not ready to run the end user interface facility 10-15 at this time. Control is returned to "edit an object" block 10-1046 and the expert user is allowed to continue editing the knowledge base 10-12.

However, if the <ALT><E> keys were pressed, this means that the expert user wants to go to the end user system facility to try out the changes or modifications made to the knowledge base 10-12. This results in control being passed to block 10-1050 which determines if control is to be passed to the end user interface facility 10-15. If the edit flag is not set, indicating that the expert user is still not ready to switch to the end user interface facility 10-15, control is passed back to block 10-1046 and remains with the expert user interface facility 10-104. The expert user can continue on with editing the knowledge base 10-12, under the control of the edit object block 10-1046.

DESCRIPTION OF OPERATION

The operation of the system of FIG. 2b will now be described with specific reference to FIGS. 3 through 7c. It will be assumed that the particular application for which the system is to be used is that of configuring computers in which the system provides a user with the required product designations for a variety of different computer product lines. Therefore, the expert user would enter questions and information or data specific to computers. Accordingly, the end user interface facility 10-15 would generate questions pertaining to computers and list such information as choices.

Figure 6A:
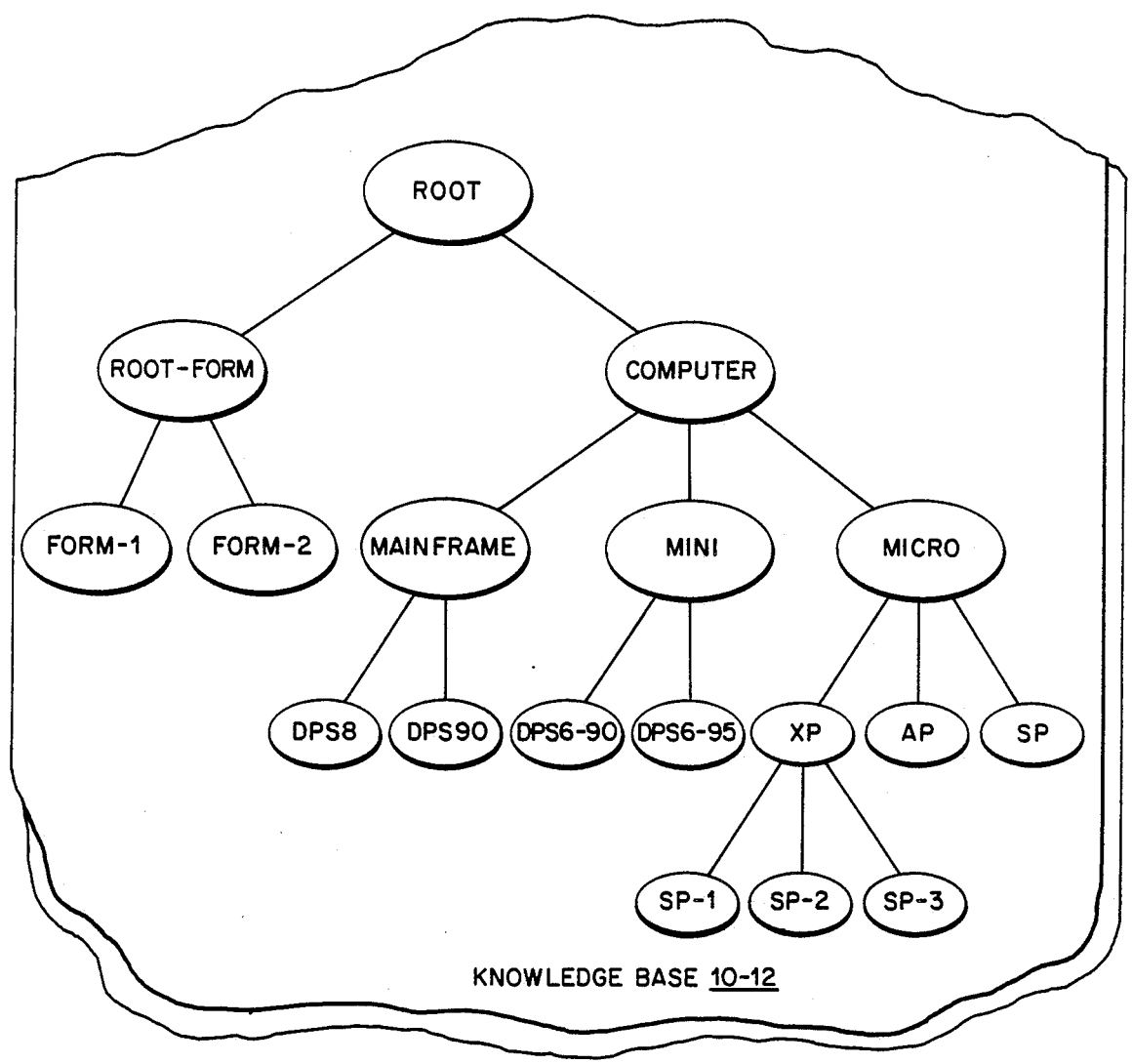

By way of example and for ease of explanation, it is assumed that the expert user has stored in knowledge base 10-12, frame objects which pertain to the "COMPUTER" items and form items of FIG. 6a. These frame objects are organized as shown. More specifically, from the root or top most node, there is a node labeled "COMPUTER." Thus, the knowledge base 10-12 has at a first level, a frame object named "COMPUTER." The parent of the frame object named "COMPUTER" is "ROOT." This frame has three children or subclasses named "MAINFRAME," "MINI" and "MICRO." These are represented by frames having the names "MAINFRAME," "MINI" and "MICRO." The parent of these frames is the frame called "COMPUTER." The frame "MAINFRAME" has two children or subclasses named "DPS80"* and "DPS90" which are represented by frames of the same name. The frame "MINI" has children named "DPS6-90" and "DPS6-95" which are represented by frames having the same name. The frame named "DPS6-90" has two children or subclasses named "DPS6-91" and "DPS6-92" which are represented by frames of the same names.

As seen from FIG. 6a, the frame "MICRO" has three children or subclasses having the names "XP," "AP" and "SP." These subclasses are represented by frames of the same names. The frame "SP" has three children or subclasses named "SP-1," "SP-2" and "SP-3." These three subclasses are represented by frames having the same names. * DPS is a trademark of Bull HN Information Systems Inc.

Each of the defined frames has one or more of the following defined slots or attributes: a slot called "TYPE," a slot called "PRODUCT LINE," a slot called "MODEL," a slot called "MEMORY SIZE" and a slot called "DISK SIZE." Additionally, each slot has one or more facets or properties. Specifically, the slot named TYPE has a facet called "CHOICES" which is a choice list facet for the slot "TYPE." Also, the slot "TYPE" has another facet called "PRINT-NAME." Certain other slots have facets called "VALUE." The specific frames, their slots and values stored in knowledge base 10-12 are shown in greater detail in FIG. 6b.

Referring to the frame called "COMPUTER," it is seen that the choice list facet for the slot "TYPE" contains three values, "MAINFRAME," "MINI" and "MICRO." This means that the value for the slot "TYPE" must come from one of these values. The facet "PRINT-NAME" establishes what is to be printed out on the screen. In the case of the "COMPUTER" frame, the PRINT-NAME is "TYPE." The "COMPUTER" frame has the slot called "PRODUCT-LINE" which has a facet called "CHOICE-RULESET" which is different from the facet called "CHOICES." The facet "CHOICES" causes a list of choices or possibilities to be displayed. The facet "CHOICE-RULESET" causes a ruleset named "FIND-PRODUCT-LINE" to be fired which results in the generation of a list of choices. Thus, the facet "CHOICES" is static while the facet "CHOICE-RULESET" is dynamic in that it is established at run time.

The slot "PRODUCT-LINE" has a second facet "PRINT-NAME" which has the value "PRODUCT-LINE" be pointed out on the screen. Additionally, the COMPUTER frame has the slots MODEL, CPU MEMORY-SIZE and DISK-SIZE. The slots "MODEL" and CPU have no values, while the slots "MEMORY-SIZE" and "DISK-SIZE" each has a facet called "PRINT-NAME." For the slot "MEMORY-SIZE," the value is "MEMORY SIZE," while the value for slot "DISK-SIZE" is "DISK SIZE."

At the next level, under the "COMPUTER" frame, is the frame called "MINI." As seen from FIG. 6b, because of the inheritance mechanism, it is not necessary to duplicate all of the slots and all of the facets, because anything not defined in the frame "MINI" will be inherited from its parent frame "COMPUTER." It is only necessary to specify the differences (i.e., the more specific information).

As previously mentioned, the frame "MINI" has the indicated parent and children. Also, the frame has more specific information about the slot "TYPE" and the slot "MEMORY-SIZE." That is, the slot "TYPE" must have the value "MINI" since that is the only correct choice. That is, the computer type in the case of a minicomputer is "MINI." For the slot called "MEMORY-SIZE," the facet called "CHOICES" has the values 2 through 16 megabytes as specified in FIG. 6b. The values for the facet "CHOICES" for the slot "MEMORY-SIZE" is specified at this level since it is based on whether it is a mini, micro or mainframe type of computer.

At the next level down, there is the frame named "DPS6-90" which is a product line of the "TYPE" called "MINI." The slot called "PRODUCT-LINE" must have the value "DPS6-90" since the product line in the case of the DPS6-90 is "DPS6-90." The slot called "MODEL" has a facet called "CHOICES" which has the values "DPS6-91" and "DPS6-92."

The frame named "DPS-91" is located at the next level. The value facet for the slot named "MODEL" is specified as "DPS6-91." The slot called "MEMORY-SIZES" has a facet called "CHOICES" which can only have the values 10, 12, 14 or 16 megabytes. Also, the slot has a facet called "DEFAULT" which has the value "16 megabytes." This means if no value for "MEMORY SIZE" is specified, then the memory size will be 16 megabytes.

FIG. 6b also shows the slots and facets for the microcomputer product line frames. As shown, the only slot required to be specified for the frame "MICRO" is the "TYPE" slot since all other information will be inherited from the frame's parent frame "COMPUTER." The TYPE slot facet has the value MICRO. At the next level is the frame "SP" which contains the slots called "PRODUCT-LINE," "MODEL" and "MEMORY-SIZE." The facet "VALUE" for the slot "PRODUCT-LINE" is "SP", while the "CHOICES" facet for the slot "MODEL" has the values SP-1, SP-2 and SP-3. The "CHOICES" facet for the slot "MEMORY-SIZE" can only have the values 2, 4, 8 and 16 megabytes. For the frame called SP-1, it is only necessary to specify that the facet value for the slot "MODEL" must be "SP-1." The "CHOICES" facet for the slot "MEMORY-SIZE" can only have a value of 2 megabytes. The same is true for the frame called "SP-3." (i.e., the facet value must be "SP-3").

In addition to the above described frame objects, the knowledge base 10-12 further stores the two form objects specified in FIG. 6c.

The form objects are used to display the required information on CRT monitor 12. As seen from FIG. 6c, there are two frame forms called FORM-1 and FORM-2. The form called FORM-1 has as its parent, the frame called ROOT-FORM. Each such form object has a set of slots or attributes which are different from those of the frame objects. For a form, the system requires coordinate values (i.e., X, Y, height, width) which define the shape of the window area and its location on the screen. Thus, for each form object, the following slots have been defined: X-coordinate, Y-coordinate, width and height.

Additionally, each form object has a slot called "ITEM-LIST." The "ITEM-LIST" determines the actual questions which will be displayed on the form. For the frame called form-1, the slot "ITEM-LIST" has a facet called "RULESET." The value of the facet is "FIND-FORM-1-ITEM LIST." When the form-1 is displayed, the system will fire the specified ruleset which will return a list of items to be displayed. Additionally, form-1 has another slot called "NEXT-FORM." This slot has a facet called "FORM" which has a value "FORM-2." When the form-1 is closed, the "NEXT FORM" slot determines what form is to be displayed next.

The frame FORM-2 has a similar set of X-coordinate, Y-coordinate, width and height slots. However, instead of using a ruleset for the slot named item-list, the items which should be displayed are listed. In the case of frame "FORM-2," there are two items to be listed. Each item is defined by a pair of values, the first value defines the frame and the second value defines the slot. In this case, the system displays as a first item, the value or the frame called computer product-line model and the slot called "MEMORY-SIZE." The second item to be displayed is the value for the frame called computer product-line model and the slot called "DISK-SIZE." The brackets are used to specify the value of the slot. Since frame FORM-2 has no "NEXT-FORM" slot, this means that this is the last form.

As previously mentioned, in the case of the present example, there are two rulesets stored in knowledge base 10-12. One is the choice list ruleset in the COMPUTER frame for the slot "PRODUCT-LINE" shown in FIG. 6b. This ruleset is named FIND-PRODUCT-LINE. The other ruleset is referred to in FIG. 6c under FORM-1, in the slot named "ITEM-LIST." The name of this ruleset is FIND-FORM-1-ITEM LIST. These rulesets are shown in FIG. 6d.

From FIG. 6d, it is seen that the first ruleset contains three rules. The first rule of the ruleset states if the computer "TYPE" is "MAINFRAME," then a list will be displayed which contains the items "DPS80 and "DPS90." The second rule states that if the computer "TYPE" is "MINI", then a list will be displayed which contains the items DPS6-90 and DPS6-95. The last rule states that if the computer "TYPE" is MICRO, then a list will be displayed which contains the items XP, AP and SP.

The second ruleset FIND-FORM-1-ITEM-LIST only contains a single rule. It states that if true which means is always the case, a list of three items are to be displayed on FORM-1. The first item is computer, TYPE, the second is COMPUTER, PRODUCT-LINE and the third is COMPUTER, PRODUCT-LINE, MODEL. The first item is obtained by locating the value contained in the frame "COMPUTER" and slot "TYPE." The second item is similarly obtained by locating the value contained in the frame COMPUTER and slot "PRODUCT-LINE." The third item is indirectly obtained by locating the value in the frame identified by the slot of the frame COMPUTER, slot "PRODUCT LINE" and slot "MODEL."

The operation of the system of FIG. 3 will now be described relative to the form examples of FIGS. 7a, 7b and 7c. Starting with FORM-1, as seen from FIG. 7a, the screens displayed for FORM-1 is defined by the FORM-1 frame of FIG. 6c. The slot item-list references the ruleset called FIND-FORM-1-ITEM-LIST which generates three items: computer type, computer product line and computer product line model as indicated by FIG. 6d. The end user interface facility 10-15 operates to display the first item "TYPE" on a first screen. The item "TYPE" comes from the frame "COMPUTER," slot "TYPE." The system locates the frame named "COMPUTER" and slot named "TYPE" from knowledge base 10-12 and finds that three choices are specified. As shown in FIG. 6b, the three choices are MAINFRAME, MINI and MICRO. These choices are displayed in the bottom right-hand corner of screen 1. Also, the print-name "TYPE" is displayed.

The end user can select or enter one of the listed items or exit by processing key <F10>. In this example, it is assumed that "MINI" is selected as indicated in screen 2. That is, the end user inserts the word MINI into the field adjacent to the word "TYPE." The next item on the item-list is the computer product line. The system next locates the frame "COMPUTER," slot "PRODUCT-LINE" and displays its print-name PRODUCT LINE as indicated in FIG. 6b. The system then obtains the choices for the item by locating the ruleset named FIND-PRODUCT-LINE from knowledge base 10-12. As seen from FIG. 6d, since the "TYPE" of computer selected was MINI, the second rule of the ruleset is fired by inference engine 10-14. This causes inference engine 10-14 to return to the end user interface facility 10-15 for display, the two choices "DPS6-90" and "DPS6-95."

It is assumed that the end user enters into the adjacent field "DPS-90" as indicated in screen 3. The third item on the item-list is computer product line model. Since the computer product line is DPS6-90, the name of the frame of the third item to be located next is DPS6-90 and the slot is named MODEL. As seen from FIG. 6a, the system sequences down through knowledge base 10-12 two levels and locates the frame DPS6-90. As seen from FIG. 6b, the frame DPS6-90, slot MODEL has two choices. These two choices DPS6-91 and DPS6-92 are displayed along with the print-name "MODEL" derived from the slot "MODEL."

Assuming the end user enters DPS6-91 into the adjacent field, screen 4 will display the selections as shown. This completes the generation of the FORM-1 items.

From FIG. 6c, it is seen that the next form to be displayed is FORM-2. Also, it is seen from FIG. 6c that FORM-2 has an item-list which contains two items. The first item is computer, product line model, memory size. In the example, the end user selected for computer product line "DPS6-90" and for model "DPS6-91." Therefore, the system locates the pair frame, slot which has the frame named DPS6-91, slot memory size. The system first determines the "PRINT-NAME" through inheritance by moving up the tree until the print-name MEMORY SIZE is located in the frame "COMPUTER." The FORM-2 screen displays "MEMORY SIZE" as shown.

Next, the system finds out the choices. From FIG. 6b, it is seen that the frame DPS6-91, slot "MEMORY-SIZE" has the choices "10MB, 12MB, 14MB, 16MB." These choices also are displayed. When the user selects one of these values, the system generates the next item. As seen from FIG. 6c, this corresponds to the item "computer product line model disk size." In this example, this will be the disk size for the DPS6-91 frame. The print-name DISK SIZE will be displayed and the end user will make the selection. Since FORM-2 has no next form, the system exists from the application.

Another example of the form sequencing by system will now be described relative to FIG. 7b. Referring to FIG. 7b, it is seen that the first screen displayed for FORM-1 is the same as that shown in FIG. 7a. However, it is assumed in this example that the end user entered "MICRO" as the "TYPE" of computer.

From FIG. 6b, it is seen that the ruleset FIND-FORM-1-ITEM-LIST lists the item computer, product line as the next item. The system locates the frame "COMPUTER," slot "PRODUCT LINE." The "CHOICES" for computer product line is generated by the ruleset "FIND-PRODUCT-LINE." Referring to FIG. 6c, it is seen that because of the MICRO selection, the ruleset fired by the inference engine 10-14 returns a different list of choices to the end user interface facility 10-15. As seen from FIG. 6b, the choices correspond to "XP," "AP" and "SP" which are returned and displayed on CRT monitor 12 as shown in screen 2 of FIG. 7b.

Assuming that the end user enters the product line "SP," the system next locates the third item in the list which is named COMPUTER [PRODUCT-LINE], MODEL. Since the end user selected as computer product line "SP," the system then locates the frame named "SP," slot named "MODEL." As seen from FIG. 6b, the choices listed for the slot "MODEL" are SP-1, SP-2 and SP-3. These choices are returned to the end user interface facility 10-15 and displayed as shown in screen 3 of FIG. 7b. Assuming that the end user selects "SP-3," this completes FORM-1.

As seen from FIG. 6c, the system sequences to the next form, FORM-2. This form has two items as shown. The first item is the frame "COMPUTER [PRODUCT-LINE][MODEL]," slot "MEMORY-SIZE." This frame is "SP-3." The system locates frame "SP-3" and slot "MEMORY-SIZE."

As seen from FIG. 6b, the frame SP-3 has no slot "MEMORY-SIZE." Through inheritance, the system goes back to the parent frame SP and finds a slot called "MEMORY-SIZE." From this slot, the system returns the choices 2MB, 4MB, 8MB and 16MB to the end user interface facility 10-15. These choices are displayed to the end user as shown in screen 5 of FIG. 7b.

Assuming that the end user selects one of the choices, the next item of FORM-2 is located. This item is the frame "COMPUTER [PRODUCT-LINE][MODEL], slot DISK-SIZE. Since the frame is also "SP-3," the system locates frame "SP-3" and slot DISK-SIZE. This results in the display of the print-name DISK SIZE derived through inheritance from the frame "COMPUTER," slot "DISK-SIZE." The choices for disk size would be established in a manner similar to the choices for memory size. This completes FORM-2.

A last example of form sequencing by system 10 will now be described relative to FIG. 7c. The first four screens are sequenced through as described with reference to FIG. 7b. However, in this example, the end user selects "SP-1" as the model of microcomputer. This results in FORM-2 displaying the two items shown in FIG. 6c. Since there is only one choice for the slot "MEMORY SIZE," the inference engine 10-14 returns the value "2MB." This value is then displayed by the end user facility 10-15 which automatically sequences to the next field or item "DISK SIZE." At this point, the inference engine 10-14 causes the end user interface 10-15 to stop and wait for input from the end user. Thus, the inference engine 10-14 through inferencing automatically provides the necessary information based upon information stored in knowledge base 10-12.

Figure 7A:
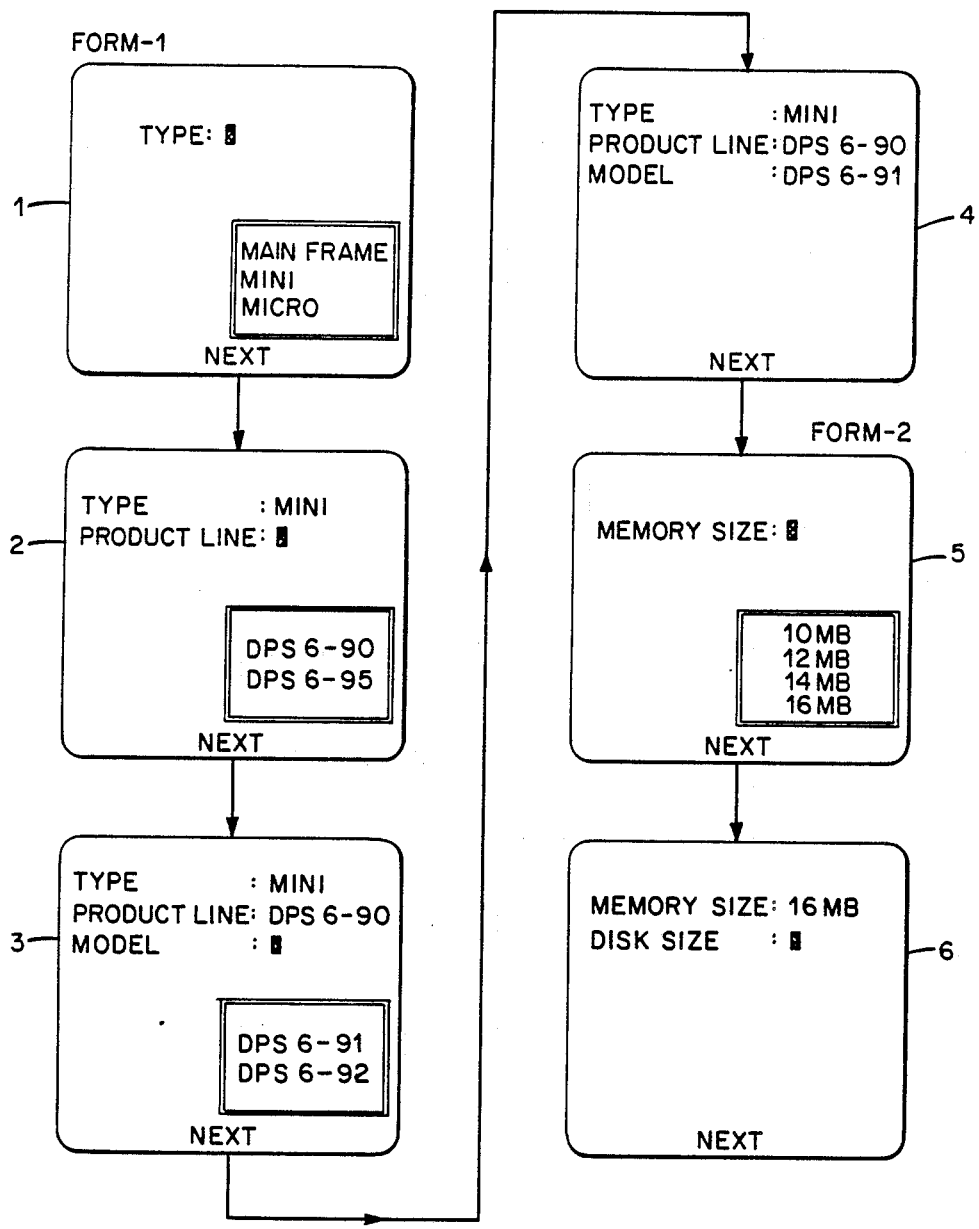
Figure 7C:
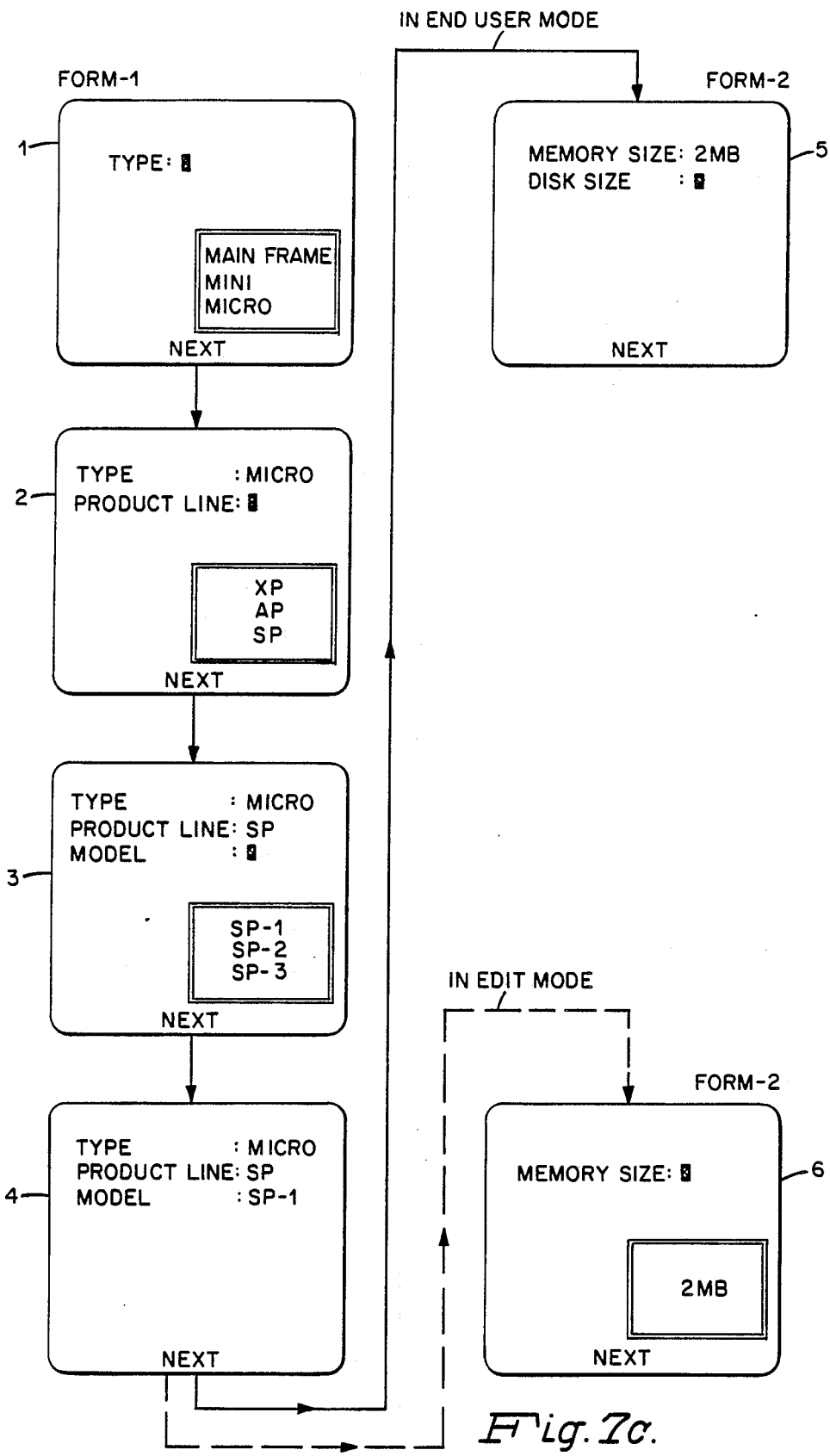

By contrast, as explained herein, when the end user interface facility 10-15 is being operated in edit mode, the end user interface facility 10-15 stops at the item "MEMORY-SIZE" and waits for input as shown by the FORM-2 screen 6 of FIG. 7c.

With reference to FIGS. 3 through 7c, the overall operation of the system of FIG. 2b will now be described in terms of updating operations performed by an expert user. It is assumed that the system is first initialized under the control of block 10-1040. At that time, certain indicators, flags, pointers and variables are set to ZEROS. One such indicator is the edit mode indicator flag of block 10-1044 which would be set to ZERO or "no." As previously discussed, the system end user interface facility 10-15, under the control of block 10-1042, operates to display the top level menu of FIG. 5a.

It will be assumed that the expert user wants to modify some frames of knowledge base 10-12 of FIG. 6a. After modifying knowledge base 10-12, the expert user wants to verify the behavior of the system as a result of making these modification. To do this, first the expert user, using the arrow keys of keyboard 14, selects the knowledge base menu from the two choices corresponding to "Knowledge Base" and "System" of the top level menu of FIG. 5a. This selection causes the system to display a menu like that of FIG. 5b which lists the possible objects of the knowledge base 10-12 which can be modified.

Figure 5A:
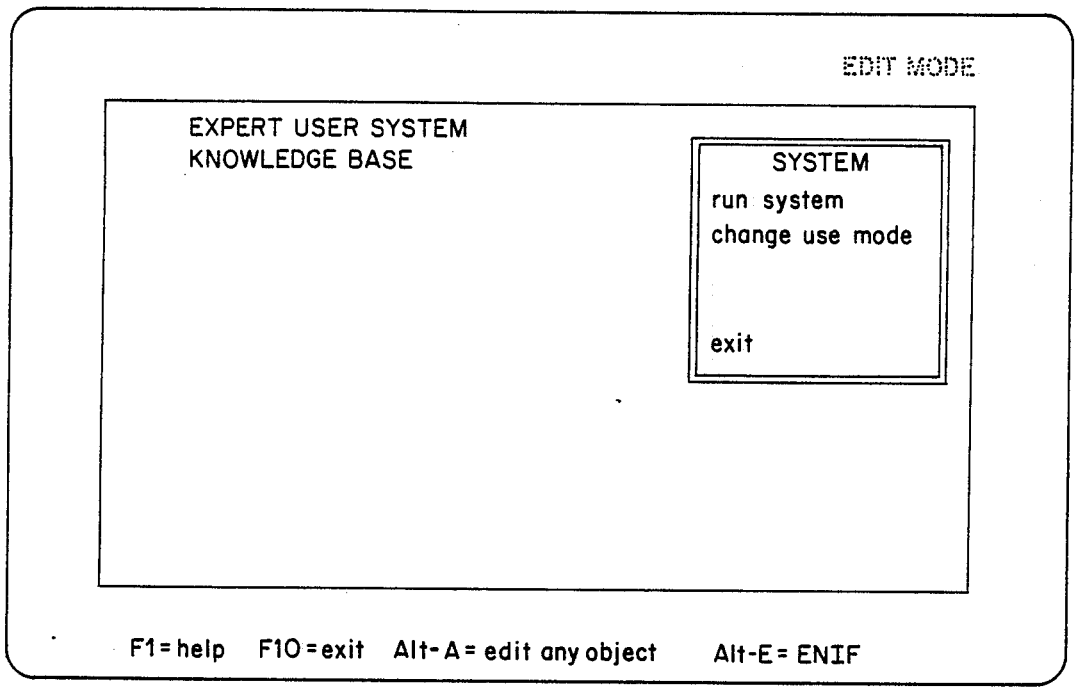
FIG. 5a through 5s show sequences of menus used to explain the operation of the present invention.
Figure 5B:
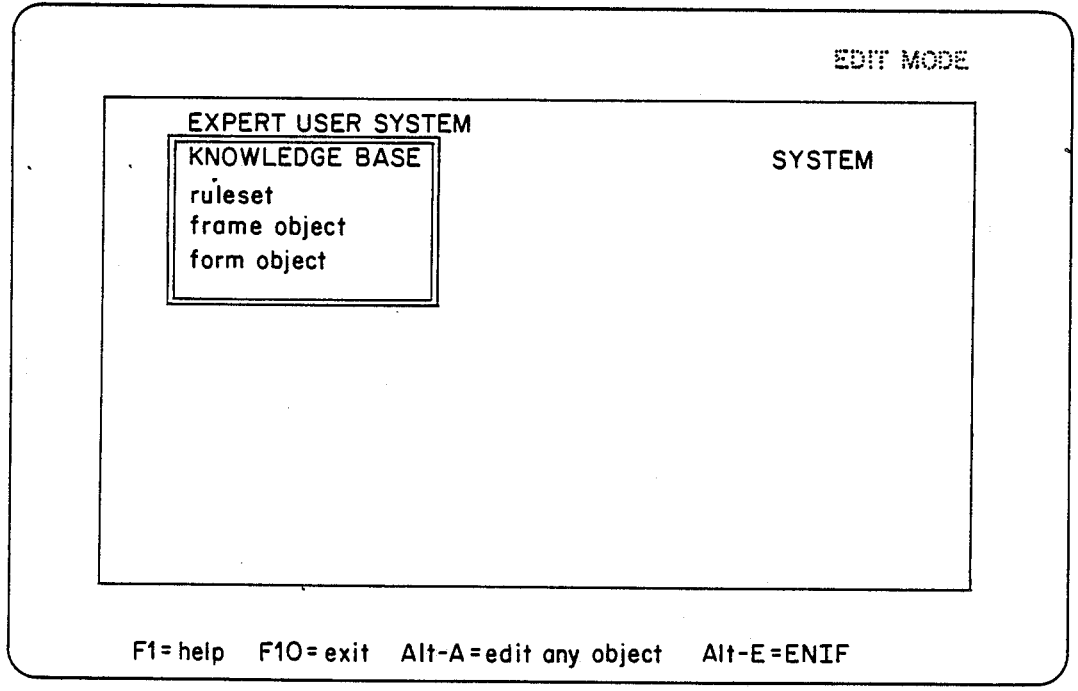

As shown, the menu of FIG. 5b lists for choices ruleset frame object and form object. Since the expert user wants to make changes to one or more frame objects, the expert user moves the cursor to the frame object option and presses the <ENTER> key of keyboard 14. This causes the expert user interface facility to display a menu like that of FIG. 5c which lists the number of operations that can be performed on the top most frame of FIG. 6a (i.e., the ROOT frame) or on the frame's slots.

Figure 5C:
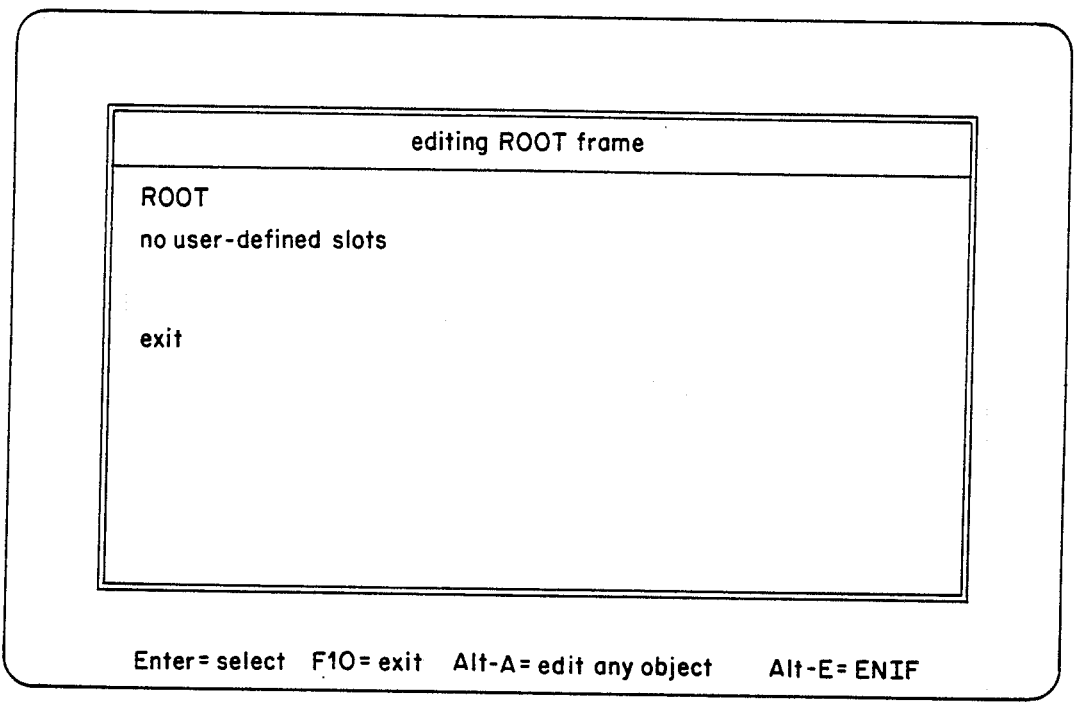
Figure 5D:
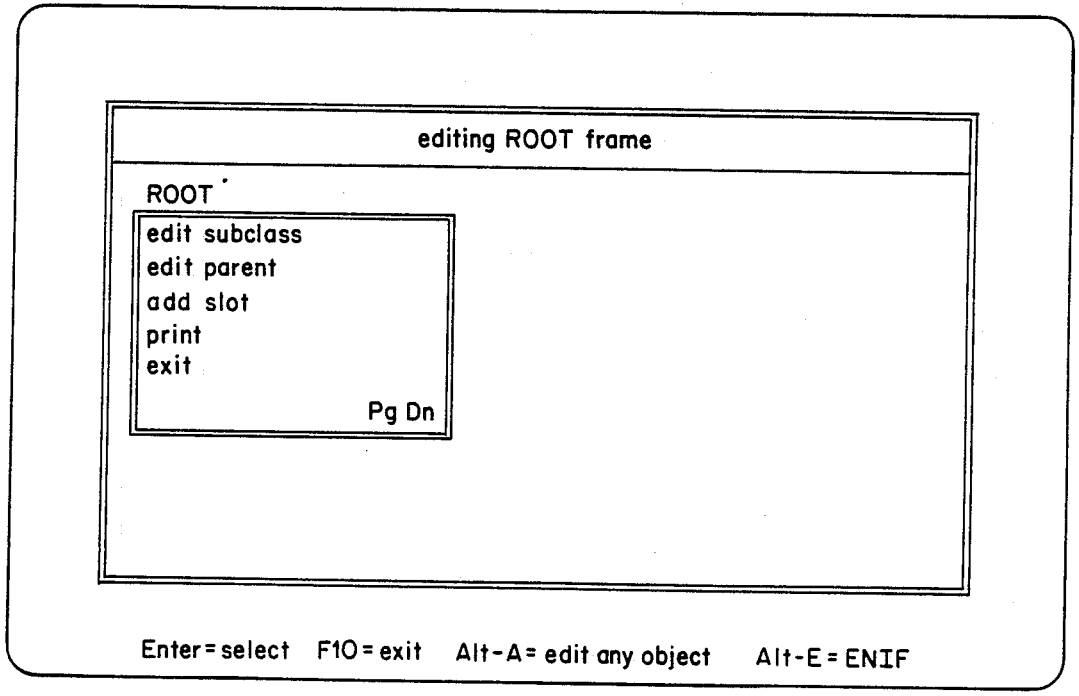

As seen from FIG. 5d, these choices include "parent" and "subclass" which allow the expert user to move up and down the tree structure of knowledge base 10-12.

To navigate up one level, the expert user selects "parent," and to move down one level, "subclass" is selected. When the expert user wants to add a slot, that choice is selected and this results in the system displaying the class, here ROOT, frame for editing such as shown in FIG. 5c. Since this is the top most frame, there is no information and hence no defined slots.

Figure 5E:
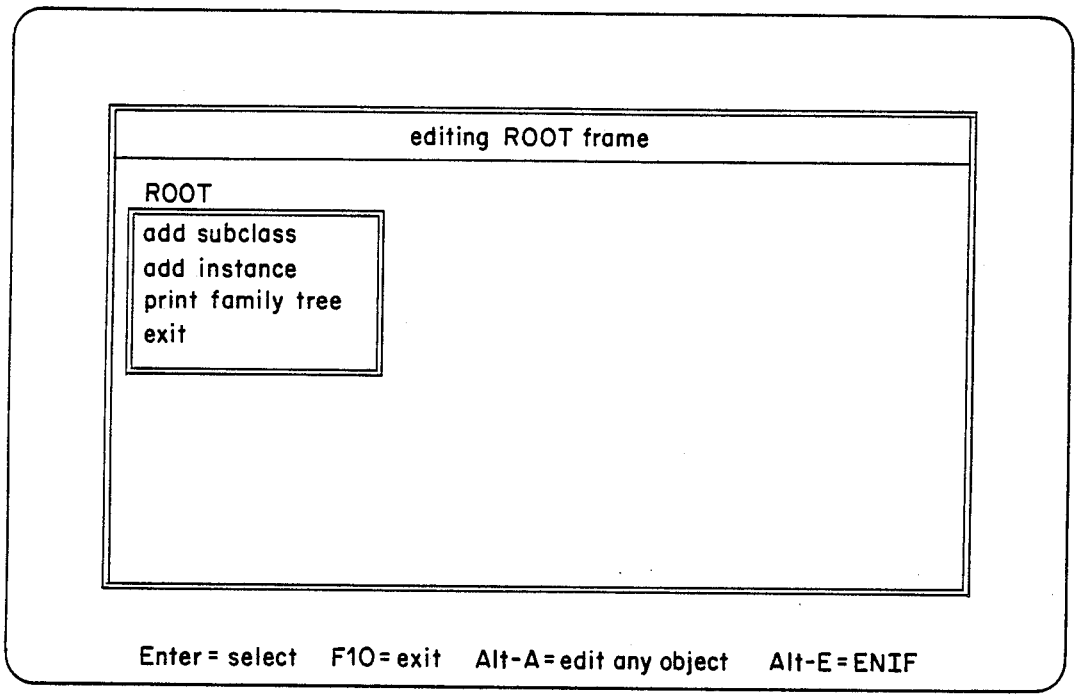

The notation PgDn in FIG. 5d indicates to the expert user that by pressing the page down <PgDn> key, further operations which can be performed on the frame are shown in a next page or screen such as that of FIG. 5e. Pressing the page up <PgUp> displays the previous menu screen. The choice "add instance," similar to "subclass," allows the expert user to move down one level.

Figure 5F:
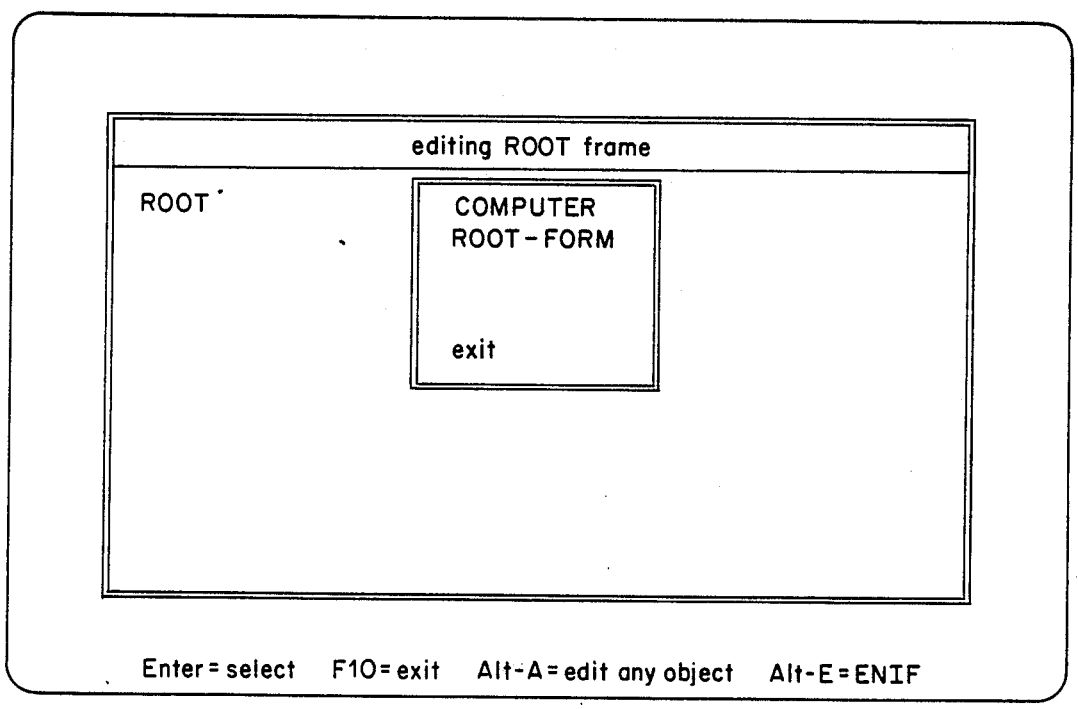

In the present example, it is assumed that the expert user wants to modify other frames within the knowledge base 10-12. Therefore, the expert user selects "edit subclass" of the ROOT frame operations screen of FIG. 5d. This causes the expert user interface facility 10-104 to return and display a window listing of the subclasses for the ROOT frame. As seen from FIG. 6a, and as shown in FIG. 5f, the list consists of two items or branches which correspond to the frames named "COMPUTER" and "ROOT-FORM."

Figure 5G:
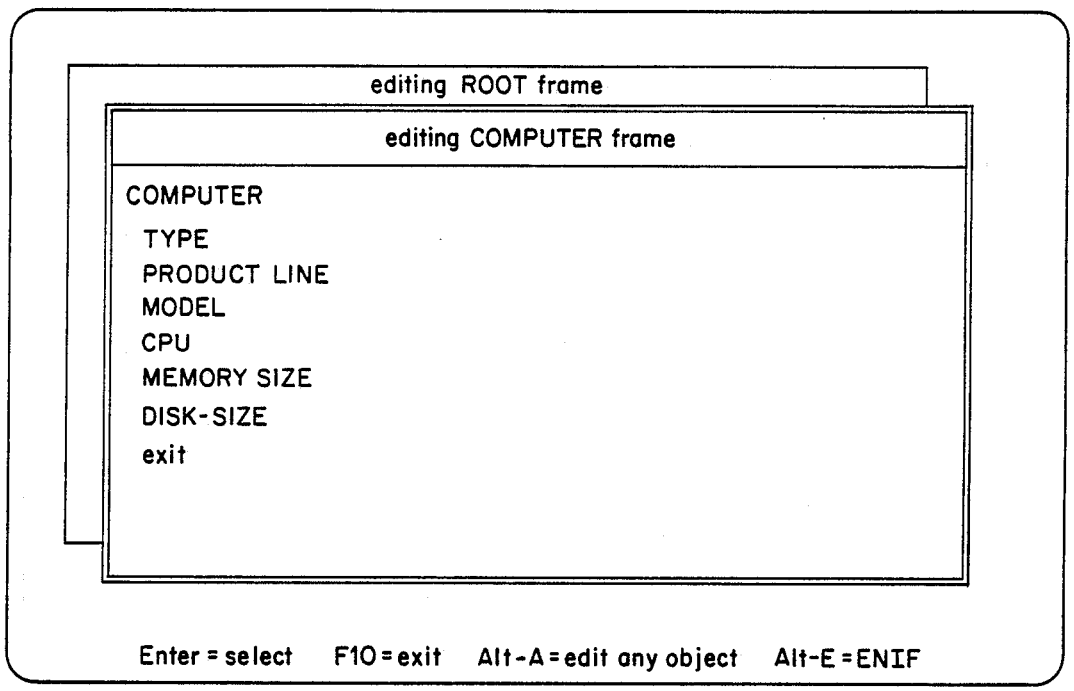
Figure 5H:
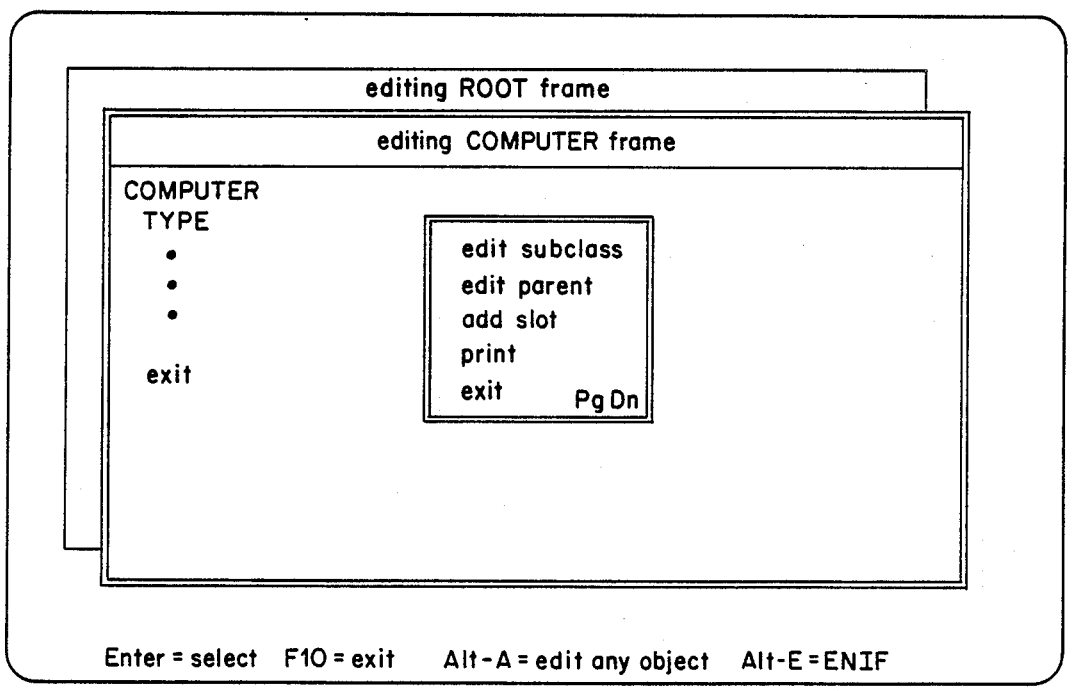
Figure 5I:
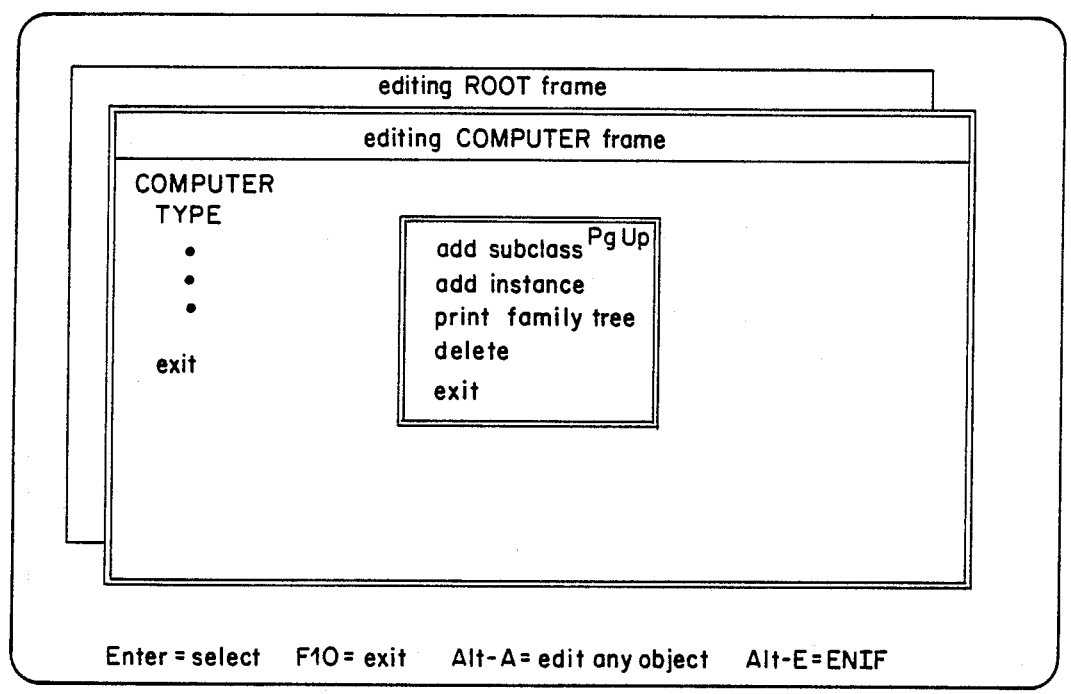

When the expert user wants to edit the "COMPUTER" frame, the cursor is moved to the item "COMPUTER" and the <ENTER> key is pressed. This results in the return and display of the "COMPUTER" frame as shown in FIG. 5g. By moving the arrow keys or cursor to select the name of the frame and then pressing the <ENTER> key, this causes the expert user interface facility 10-104 to display a screen of allowable operations such as that of FIG. 5h which is similar to that of FIG. 5d. By pressing the <PgDn> key, a next screen such as that of FIG. 5i will be displayed.

When the expert user wants to modify the TYPE slot of the COMPUTER frame, the expert user moves the cursor to "TYPE" listed in the COMPUTER frame screen of FIG. 5g and then presses the <ENTER> key. This causes the expert user interface facility 10-104 to present a list of items obtained from return and display knowledge base 10-12 for the slot TYPE on screen such as that shown in FIG. 5j.

Figure 5J:
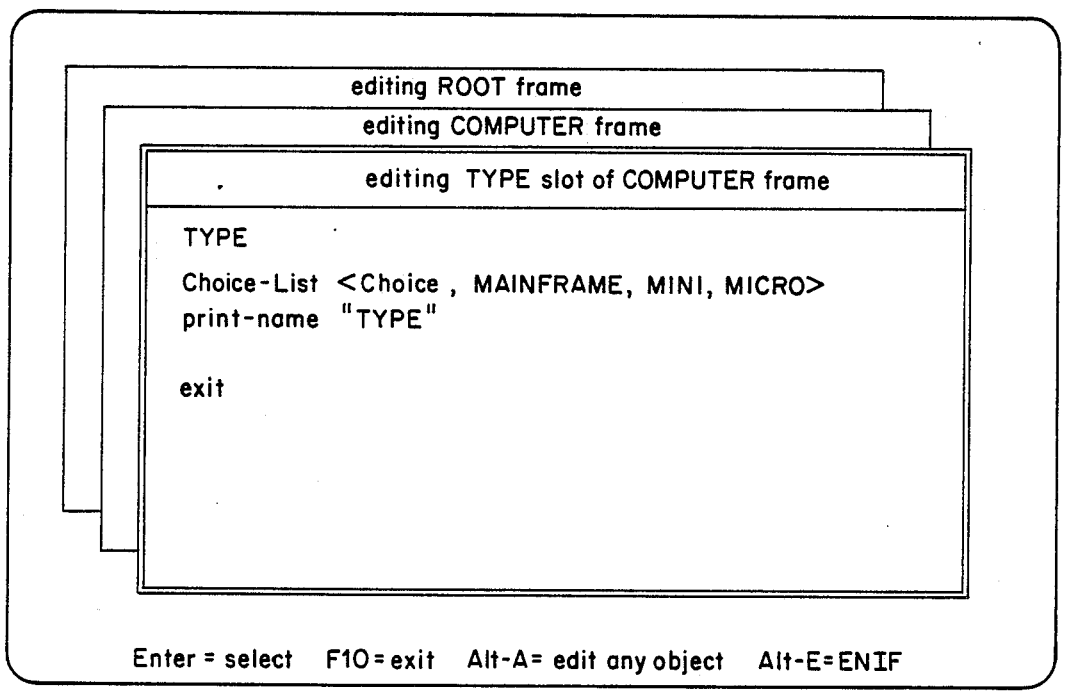
Figure 5K:
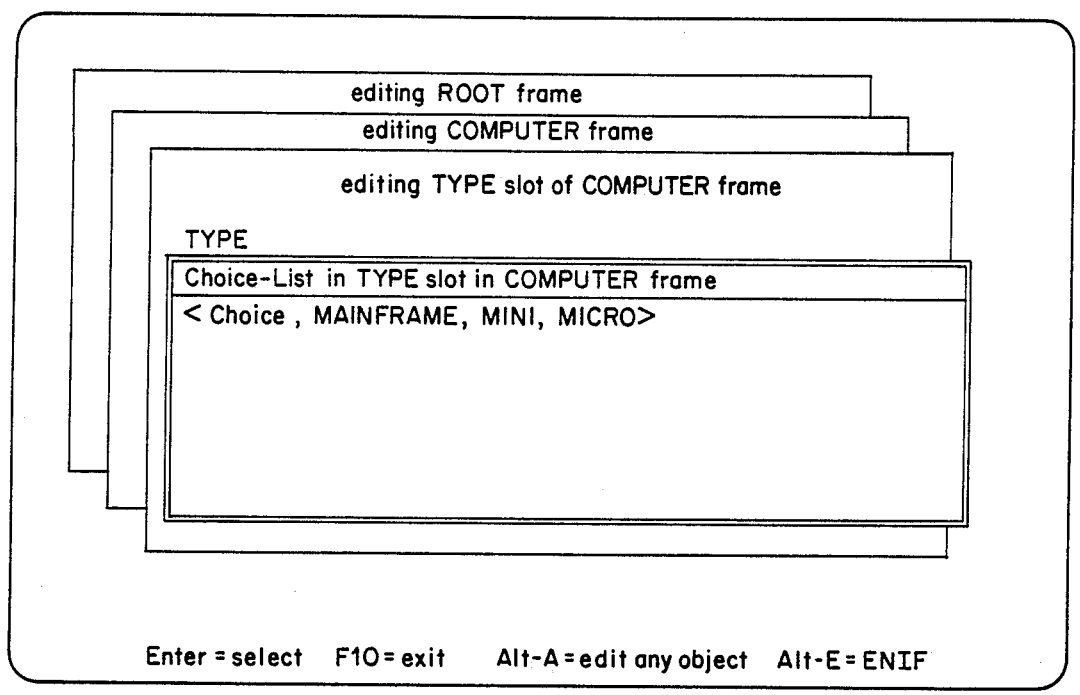
Figure 5L:
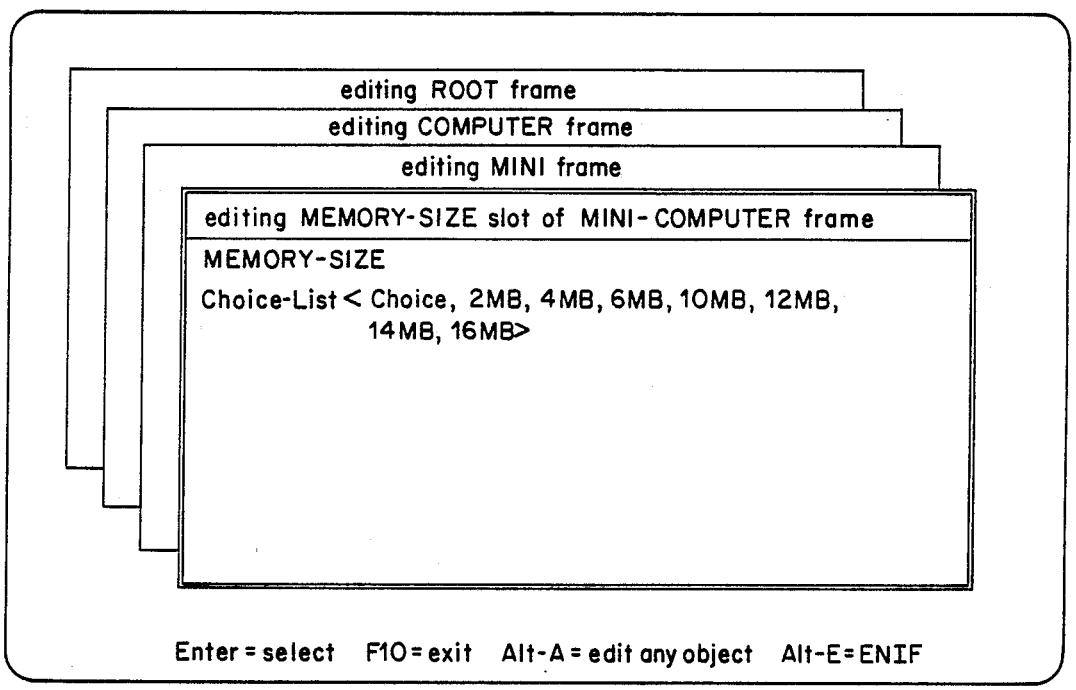
Figure 5M:
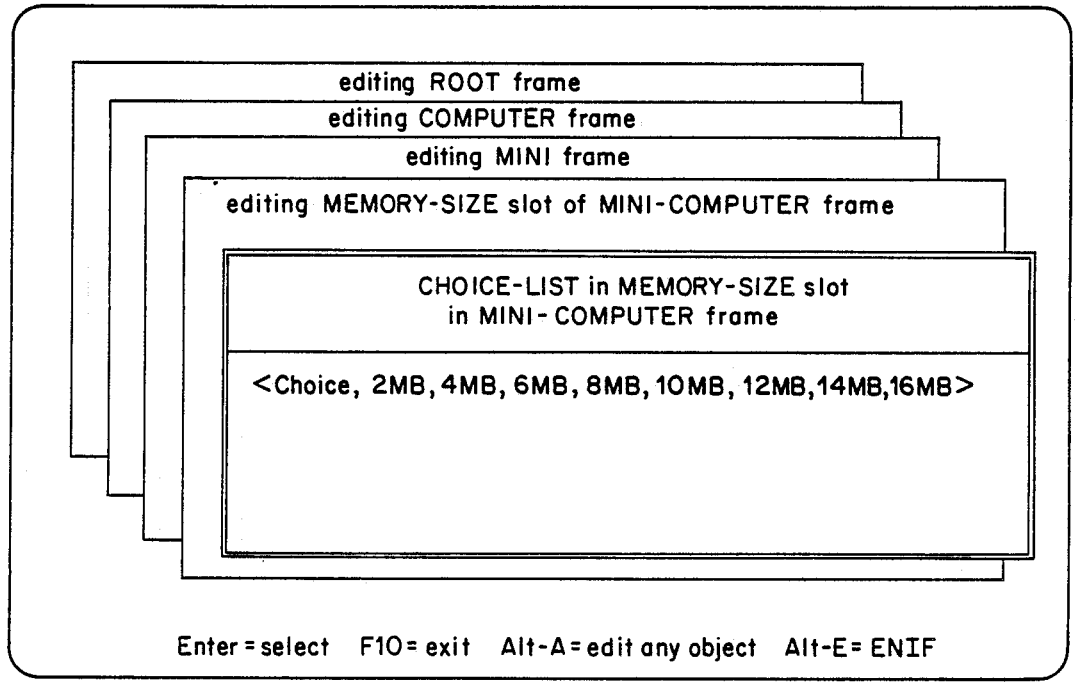

FIG. 5j displays the facets associated with the TYPE slot which can be modified. When the expert user wants to modify the list of choices, the expert user, using the arrow keys, moves the cursor to the choice-list facet and then presses the <ENTER> key to make the selection. This causes the expert user interface facility 10-104 to return and display a screen listing the possible operations which can be performed on that facet. In the case of the choice-list facet, a screen corresponding to that of FIG. 5k will be displayed.

If the expert user wanted to edit the MEMORY-SIZE slot of the frame COMPUTER, this is done by selecting the slot MEMORY-SIZE from the screen of FIG. 5g. This results in the expert user interface facility 10-104 returning and displaying a screen such as that of FIG. 5l. By selecting the choice-list facet, results in the return and display of a screen such as that of FIG. 5m.

In a similar manner, the expert user can navigate through the different levels or branches of the tree structure of FIG. 6a examining the frames, slots and facets of the other objects stored in knowledge base 10-12. Also, the expert user can access the form objects FORM-1 and FORM-2 and make changes in the same manner as described above.

Figure 5N:
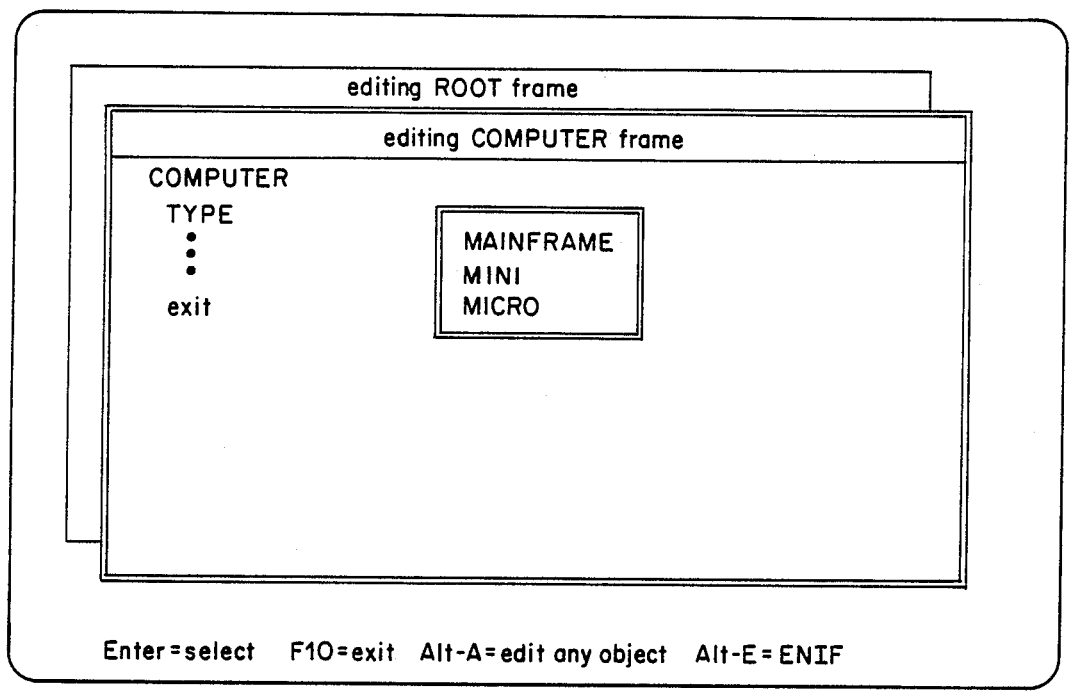
Figure 5O:
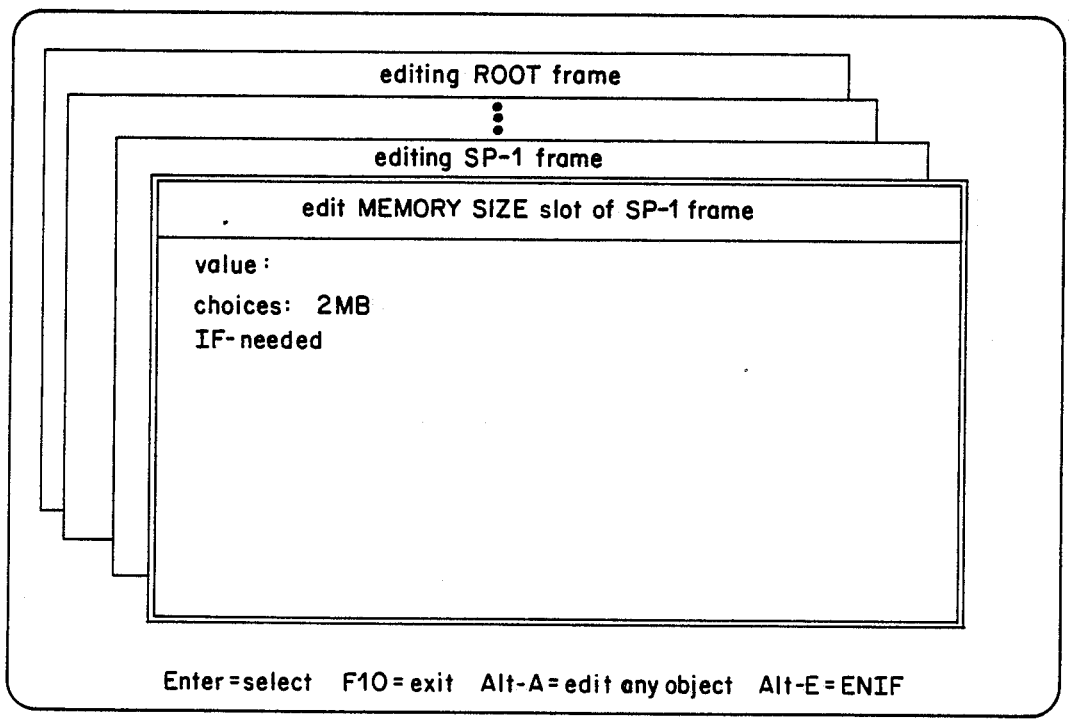

Returning to FIG. 5g, it will be seen that when the expert user repeats the operations performed on FIGS. 5d and 5f, this results in the expert user interface facility returning a screen such as that of FIG. 5n. This screen lists the three subclasses of the COMPUTER frame. When the expert user continues down the tree along the path ROOT > COMPUTER > MICRO > SP > SP-1, this results in the expert user interface facility 10-104 displaying a screen such as that of FIG. 5o. It will be noted that when system 10 displays more than one window on the screen, a label symbol is displayed for indicating that more windows are hidden behind the last window displayed.

After the necessary changes have been made, the expert user now wants to test the behavior of the system as viewed by the end user. To do this, the expert user now runs the end user interface facility 10-15 in edit mode. This is most easily accomplished by pressing the <ALT> <E> keys which cause the expert user interface facility 10-105 to present the expert user with a screen containing a single option "Go To ENIF." By pressing the <ENTER> key at this point, blocks 10-1048 and 10-1050 transfer control over to the end user interface facility (ENIF) 10-15. This results in the facility presenting an initial end user system screen such as shown in FIG. 5p.

As previously mentioned, the expert user also can select the system menu of the initial expert user interface facility screen of FIG. 5a. By then, selecting the "change use mode" option and switching it to the "ON" state, this places the end user interface facility 10-15 in an edit mode of operation. At the same time, the "Edit Mode" indication is also displayed. When in this mode, the end user interface facility 10-105 will stop at every item of every form rather than infer as much information as possible from the information already available as is the case when the system is operated by an end user (i.e., user mode). By selecting the run option of the system menu of FIG. 5a, this causes control to pass from the expert user interface facility 10-104 to the START block 10-150 of end user interface facility 10-15 of FIG. 3.

Figure 5P:
Figure 5Q:
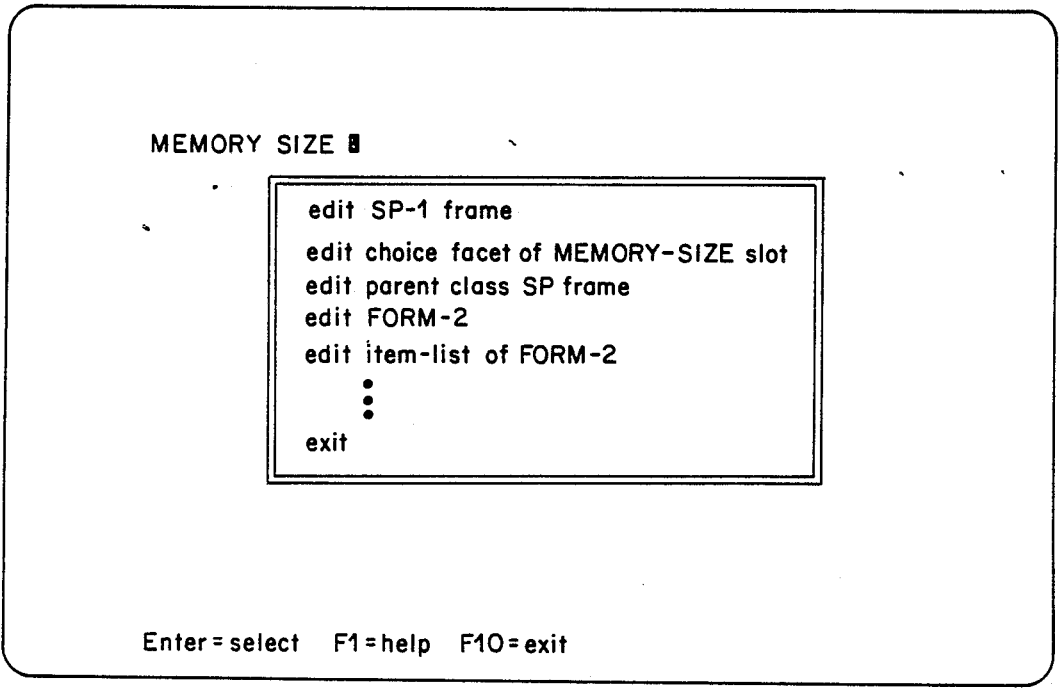
Figure 5R:
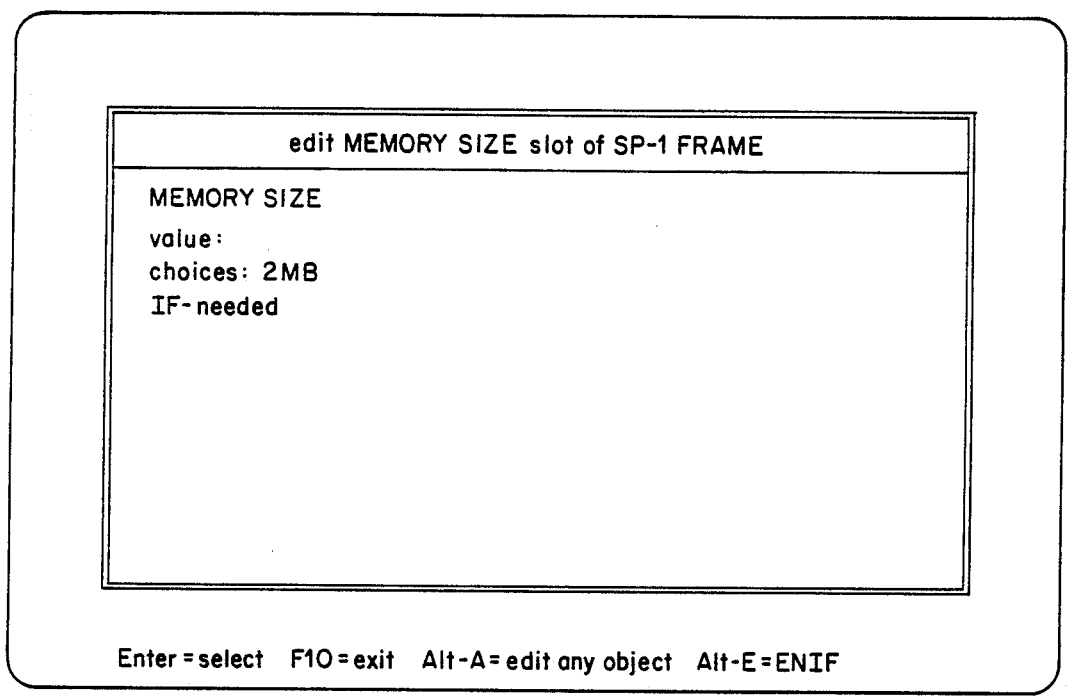

As previously mentioned, the system displays the initial end user form of FIG. 5p. If the expert user presses key <F10>, control is passed back to block 10-1052 of the expert user interface facility 10-104. When the expert user presses the <ENTER> key, the end user interface facility 10-15 block 10-150 transfers control to START NEW FORM block 10-154. This block performs the necessary preparation for generating a new form which was specified in START block 10-150. As seen from the description of Appendix I, the address or pointer corresponding to the name FORM-1 specifying its location in knowledge base 10-12 was placed into the register location *FORM*.

Since the new form is FORM-1, the end user interface facility 10-15 first finds the X and Y coordinates where the form is to be shown and its height and width on the screen according to the information specified in frame FORM-1 of FIG. 6c. A local variable X is set to the contents of the associated item list obtained from *FORM*. That is, the system accesses the knowledge base 10-12 and returns whatever value is stored in the slot ITEM-LIST of frame FORM-1 and stores that value into the variable X. If "X" is a list as in the case of FORM-2, then the list is stored in the global variable register location *ITEM-LIST*. If X is not a list, as in the case of FORM-1, it is a ruleset.

Control is then passed to START FORM OPERATION block 10-156. This block causes the system to sequence through the item list. Another local variable N is set to 1 to indicate that the first item pair is being retrieved from the item-list. Also, the system displays a window according to the coordinates and sizes of the form. The variable N provides an index so that the first time through the START FIELD OPERATION block 10-158, N=1.

Next, block 10-158 determines if the value of N is greater than the number of item pairs in the *ITEM-LIST*. If it is, the system is done with the form. As seen from FIG. 6c, FORM-2 contains two item pairs. The item pairs of the form are processed sequentially and the local variable P is set to the Nth pair of items in the item list. For example, in the case of FORM-2 when the value of N is 1, the system retrieves the first pair which is computer [product-line] [MODEL] MEMORY-SIZE. The variable P is set to *FRAME*, *SLOT*.

In the example illustrated in FIG. 7a, the first is DPS6-91 and the second item is MEMORY-SIZE. Block 10-158 also locates the print-name facet of *FRAME*, *SLOT* through inheritance by searching through the tree structure of knowledge base 10-12. Thereafter, the print name is displayed on the screen which completes the operations performed by block 10-158. The displayed form would be similar to that of FIG. 5a.

As seen from FIG. 3, block 10-160 tests to determine whether or not the expert user has pressed key <F10> to exit the form or has completed all of the questions contained on the form. If the expert user has exited the form, control is passed to START NEXT FORM block 10-162. Assuming that the expert user wants to continue testing the behavior of the system, it is seen that next block 10-164 tests whether the expert user is running the system in edit mode. Since the expert user previously set the edit mode flag when in operating the expert user interface facility 10-104, control passes to STOP AT FIELD block 10-166. When being operated in edit mode, the system simulates end user operation and stops at every field waiting for end user input from the keyboard. Thus, in this case, control does not pass to NORMAL FIELD OPERATION block 10-170.

Blocks 10-164 through 10-168 implement the simulation or edit mode of operation. The expert user positions the cursor on the print name displayed at the designated position on the screen, such as, for example, at the MODEL position of FIG. 7c and selects as a choice "SP-1." This results in the displaying of a screen such as screen 6 in FIG. 7c. The system stops there immediately and waits for the expert user to press a key including the <ALT><E> keys. If the expert user wanted to add another choice or change the choices associated with the MEMORY SIZE question, then the expert user would press the ALT><E> keys which would pass control to block 10-172 as explained herein.

However, if no changes are deemed necessary at this point, block 10-168 passed control to the NORMAL FIELD OPERATION block 10-170. Under the control of this block, the end user interface facility 10-15 using the values *FRAME*, *SLOT* accesses knowledge base 10-12 to find out whether there is a choice list for that frame. If there are choices for the frame at *FRAME*, *SLOT*, then the variable X is set to the choices (i.e., *ITEM-LIST*).

If there is no choice list as in the case of the frame, FORM-1, the end user interface facility 10-15 causes the inference engine 10-14 to fire the choice ruleset. Thereafter, the result of firing the ruleset is returned by the inference engine 10-14 to facility 10-15 which sets X to the result. The content of X is then displayed in the lower right-hand corner of the screen.

The facility 10-15 then waits for the expert user to make a selection or enter input information from keyboard 12. If the input entered is not in the list of items, the facility 10-15 causes the inference engine 10-14 to fire validation rules. When the input is contained in the X list, then the local variable N is incremented by one and control is returned to START FIELD OPERATION block 10-158. This sequence of operations is repeated until the form is completed. In the case of FORM-1, the three fields adjacent the print-names would appear filled in with three choices. At this time, block 10-160 causes an exit from the form to START NEXT FORM block 10-162. This block determines if there is a next form for *FORM*. If there is, as in the case of FORM-1, block 10-162 returns control to START NEW FORM block 10-154. If there is no next form, control passes to START block 10-150.

In the above example, the expert user did not have any need to press the <ALT><E> keys. However, at any time during the simulation process, upon identifying that the system is not behaving as contemplated, the expert user can press the <ALT><E> keys and cause the end user interface facility to pass control to block 10-172. For example, it is assumed that the expert user has made a series of selections which correspond to those illustrated in FIG. 7c. However, when the end user interface facility 10-15 returned screen 6 containing the choice 2MB, the expert user wanted to add more choices.

To make this change, the expert user just presses the <ALT><E> keys which causes control to pass to block 10-172. This block performs the operations indicated in FIG. 4. More specifically, the facility 10-15 finds the form and field the expert user was operating on just prior to pressing the <ALT><E> keys. In this example, the current form and field correspond to the register variables *FORM* and index N respectively.

Next, as indicated in FIG. 4, the facility 10-15 finds the associated frame and slot. These correspond to the values stored in the register variables *FRAME* and *SLOT*. Block 10-1724 marks the associated frame as current by storing in another variable (register location) named CURRENT, the pointer *FRAME*. Also, the variable X is set to *FRAME*. Next, block 10-1725 determines through inheritance if there is a value which exists in the current frame, slot. Stated differently, the system determines if there is a value for *FRAME*, *SLOT*. The frame pointed to by the variable X and the slot *SLOT* of that frame is examined to see if it contains a value. If it does, control passes to block 10-1726 which places the value of X and *SLOT* into a stack called CONNECTION-ITEM-LIST.

If a value is not found, block 10-1725 passes control to block 10-1727 which enables the system to obtain the value by inheritance. That is, this block determines if frame X has a parent frame. If it has a parent frame, then the register variable X is set to the name of the parent frame under control of block 10-1728. Control is then returned to block 10-1725 which repeats the operations mentioned. This sequence is repeated, searching through the parent's parent frame, etc., until a value is found or until the list of parents is exhausted (i.e., the root frame is reached).

After the sequence is completed (i.e., a value is found, all parents are exhausted or none is found), the end user interface facility 10-15 sequences to block 10-1729 which is the first block in a series of blocks which through inheritance are used to find the list of choices which exist for the current frame and slot. These blocks are implemented like the previous group of blocks.

Block 10-1729, equivalent to block 10-1724, marks the associated frame current by setting the register variable X to *FRAME* identifying the current frame. Next, block 10-1730 determines if the frame X slot *SLOT* contains specified choices (i.e., choice list). If it does, the block exists and the frame CURRENT is added to the CONNECTION-ITEM-LIST stack.

If the frame contains no choices, block 10-1731 determines if the frame has a parent frame and if it does, it marks the parent frame as the CURRENT frame (i.e., it inserts the name of the parent frame into the variable CURRENT). This loop is repeated and searching continues until a choice list is found in one of the frame's parents, or until the list of parents has been exhausted. As indicated in FIG. 4 by the dotted line, the block 10-172 further includes similar loops for locating each of the other facets such as "PRINT-NAME," "TYPE," "DEFAULT," "ITEM-LIST," etc.

At the end of these operations, all of the items connected with this operation will have been collected in the CONNECTION-ITEM-LIST stack. Next, control passes to block 10-174 which performs the necessary operations to display the stack items as a choice list. In the case of the present example, a list of choices of possible actions, such as those shown in FIG. 5q, would be presented to the expert user. If a facet includes a ruleset, the name of the ruleset will also be displayed as a choice item.

At this point, the expert user can make two types of choices. The expert user can decide to return to the operation which was being performed just prior to pressing the keys or can select one of the items on the screen. In the first case, the expert user by pressing key <F10> or selecting exit would cause control to be passed to block 10-170. However, upon selecting one of the other items on the screen of FIG. 5q, causes control to be passed to block 10-178 of FIG. 3. This block sets *ITEM* to the item selected by the expert user.

Figure 5S:
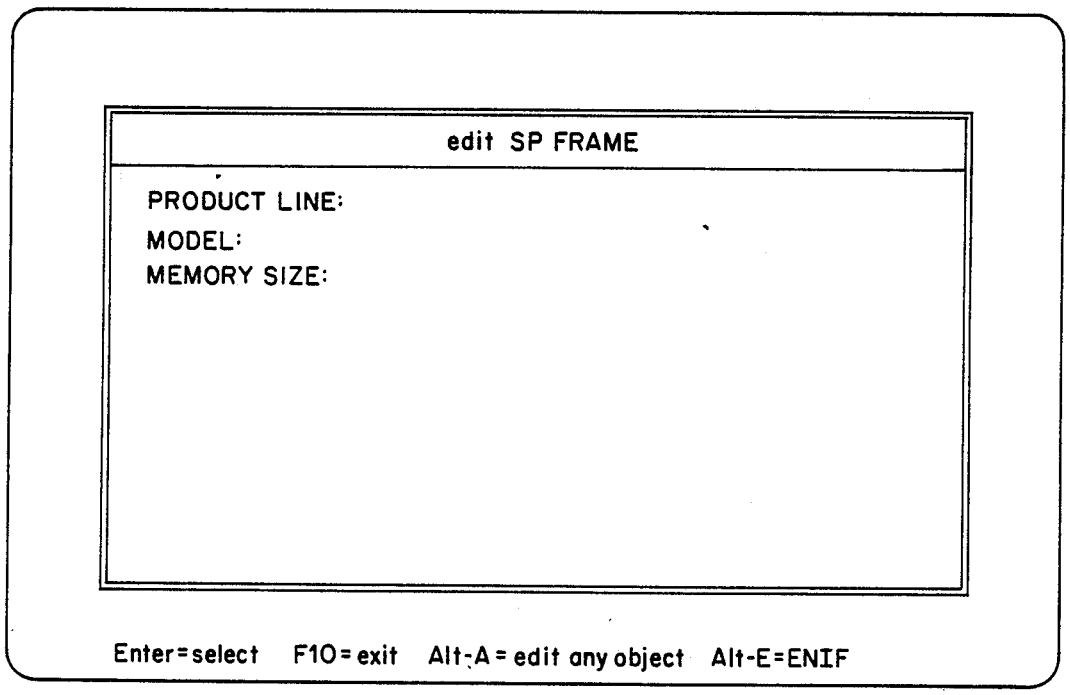

Thereafter, control is returned to block 10-1052 of expert user interface facility 10-104. Block 10-1052 determines if there is something stored in *ITEM*. Since there is, control is passed to block 10-1055 which locates the item in knowledge base 10-12 using the contents of *ITEM*. It then displays the MEMORY SIZE slot item on a screen which, in this example, corresponds to FIG. 5r. If, however, the expert user selected "EDIT parent class SP frame," then the "EDIT parent class SP frame," such as shown in FIG. 5s, would be displayed.

From the above, it is seen how the expert user can rapidly switch to the specific piece of information of a frame within knowledge base 10-12 which the expert user wants to change. In accordance with the present invention, the expert user is able to select the particular piece of information in the context of the type of operation being performed. The selection is made by means of a single keyboard key for ease of use.

This arrangement eliminates the need for having to search through the knowledge base and having to determine when the exact information to be changed has been located. Additionally, the present invention provides the expert user with an easy to use facility for customizing the menus and forms to be utilized by an end user to implement a specific application.

It will be apparent to those skilled in the art that many changes may be made to the preferred embodiment of the present invention. For example, while a combination of two keys were used to make certain selections in the disclosed embodiment, a single key could also be used. Additionally, selections can be made through other input devices, such as a mouse. Also, other menu formats, programming languages could be used to implement the teachings of the present invention.

APPENDIX I

The following is a short description of certain ones of the blocks shown in FIG. 3, including pseudo code statements.

PSEUDO CODE FOR FIG. 3

| DEFINITIONS | : * * denotes a global variable or register location which is accessible by any routine or procedure. |
|---|---|
| | : X, N and P are local variables. |
| 1. START block 10-150 | : SET *FORM* TO FORM-1 |
| 2. EXIT END USER block 10-152 | : If exit key pressed, then go to Expert User Interface Facility block 10-1052. |
| 3. START NEW FORM block 10-154 | : FIND CO-ORDINATES, WIDTH, HEIGHT of *FORM*; set X to content of the associated ITEM-LIST from variable *FORM*; If X is a list, then set *ITEM-LIST* to X, or else set variable *ITEM-LIST* to the result of "firing" the ruleset whose name is in X. |
| 4. START FORM OPERATION block 10-156 | : Set N — 1; Show up a window according to the coordinates & sizes of *FORM* |
| 5. START FIELD OPERATION block 10-158 | : If N ># of item pairs in *ITEM-LIST*, then go to START NEXT FORM block 10-162; Let P be the nth pair of items in *ITEM-LIST*, Let *FRAME* and *SLOT* be first and second items of P respectively; Find the PRINT-NAME facet of *FRAME* [*SLOT*]; Display the PRINT-NAME in the window. |
| 6. EXIT CURRENT FORM: block 10-160 | If exit-key pressed, then go to START NEXT FORM block 10-162. |
| 7. EDIT MODE=YES block 10-164 | : If edit-key mode ≠ yes, then go to NORMAL FIELD OPERATION block 10-170. |
| 8. STOP AT FIELD block 10-166 | : Position cursor on the print-name. |
| 9. <ALT><E> KEYS SELECTED block 10-168 | : Wait for input. If <ATL> <E> keys are pressed, go to FIND ALL CONNECTION ITEMS block 10-172 or else go to NORMAL FIELD OPERATION block 10-170. |
| 10. NORMAL FIELD | |

-continued

| | |
|---|---|
| OPERATION block 10-170 | : IF there are choices for *FRAME* [*SLOT*], set X to choices or else if there is a choices-ruleset, then fire the ruleset; Set X to result of ruleset firing; IF there are more than one value in X, then show the content of X at the lower righthand corner; Wait for user selection or input; IF input not in X-list, then fire validation rules; IF okay, then set N = N+1, go back to start or else notify user of end and wait for input again. IF there is only one value in X, then put the value into the field, display the value and set N = N+1, go back to start. |
| 11. START NEXT FORM block 10-162 | : If there is a next-form for *FORM*, then go to START NEW FORM block 10-154, or else go to START block 10-150. |

FIG. 4 OPERATIONS

| | |
|---|---|
| 1. KEY PRESSED block 10-1720 | : <ALT><E> keys selected, ENTER block 10-1722. |
| 2. FIND FORM FIELD block 10-1722 | : FIND variables *FORM* and N. |
| 3. FIND ASSOCIATED FRAME & SLOT block 10-1723 | : FIND variables *FRAME* and *SLOT*. |
| 4. MARK ASSOCIATED FRAME AS "CURRENT" block 10-1724 | : Set X to *FRAME*. |
| 5. DOES VALUE EXIST IN CURRENT FRAME, SLOT block 10-1725 | : Is there a value in X [*SLOT*]. |
| 6. INCLUDE CURRENT FRAME & SLOT IN CONNECTION-ITEM-LIST block 10-1726 | : Store (X, *SLOT*) in CURRENT-ITEM-LIST. |

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. An expert system which includes a knowledge base comprising a memory for storing knowledge including data representative of facts organized into frames and rulesets linked to said frames so as to create decisions using a premise-conclusion if-then form of reasoning and a programmed computer which includes an inference engine coupled to said memory for interpreting said rulesets using said if-then reasoning, said system further including:

expert user interface facility means coupled to said inference engine and to said knowledge base for generating commands to edit and update said knowledge base and for designating at least one point within said knowledge base where editing can take place;

end user interface facility means coupled to said inference engine for communicating and receiving commands from said inference engine, said end user interface facility means when operating in a predetermined mode of operation controlling the operation of said expert system and receiving input information from said inference engine indicative of the context of an operation being performed; and control means coupled to said end user facility means and said expect user interface facility means for enabling said expert user interface facility means to switch control from said and user interface facility means to said expert user interface facility means to said one point when said end user interface facility means is operating in said predetermined mode of operation and as a function of said input information received by said end user interface facility means.

2. The system of claim 1 wherein said expert user interface facility means includes edit mode selection means, said edit mode selection means when set to a first state defining said predetermined mode of operation for said end user interface facility means.

3. The system of claim 2 wherein said predetermined mode of operation corresponds to an editing mode of operation wherein said end user interface facility means causes said system to stop at each field item of each frame.

4. The system of claim 1 wherein said knowledge base is organized in a hierarchical data structure in which said frames include a number of object and form frames, each of which have a number of related slots which give specific categories of objects, a number of facets which represent specific properties of such slots that can be used to modify their behavior and a number of rulesets associated with said object and form frames.

5. The system of claim 4 wherein said computer further includes keyboard means operatively coupled to said expert user interface facility means and to said end user interface facility means, said end user interface facility means includes a find connection means in response to a predetermined keyboard selection generating said information pertaining to a plurality of choice items from the context of the operation being performed prior to said keyboard selection.

6. The system of claim 5 wherein said keyboard means includes CRT display means and said end user interface-facility means further includes display connection item means operative upon the completion of generating said information by said find connection means to display on said CRT display means said plurality of choice items for selection.

7. The system of claim 6 wherein said end user interface facility means further includes selection switching means coupled to said display connection means, said selection switching means in response to a selection made from said plurality of choice items for causing said control means to place said expert user facility means at a point within said knowledge base based on said selection.

8. The system of claim 5 wherein said find connection routine means includes:

means for identifying a form and a field being operated on prior to said predetermined keyboard selection and storing values representative of said form and field in a stack memory area;

means for identifying a frame and a slot associated with said form and field through inheritance and storing values representative of said frame and slot in said stack memory area; and, means for identifying any list of choices associated with said form and field through inheritance and storing values representative of said list of choices in said stack memory area.

9. The system of claim 8 wherein said display connection item means includes means for accessing said stack memory area, processing each stored item and displaying all of the resulting values as choice items on said CRT display means.

10. The system of claim 9 wherein said choice items displayed on said display means include:
   a name designation of a frame;
   a name designation of a slot of a frame;
   a name designation of a facet of a slot of a frame;
   a name designation of any ruleset related to a facet of a slot of a frame;
   a name designation of said form, and
   a name designation of an item-list ruleset of said form.

11. The system of claim 10 wherein said choice items further include an exit choice for enabling to continue to simulate said end user operation under control of said end user interface facility means.

12. A method of constructing an expert system which includes a knowledge base comprising a personal computer based system including a memory for storing knowledge represented in a hierarchical data structure which has a number of object and form frames, each frame having a number of related slots which give specific categories of objects, each slot having a number of facets which represent specific properties of said slot that can be used to modify slot behavior and a number of rulesets associated with said object and form frames, an inference engine coupled to said memory for interpreting said rulesets using if-then reasoning, a development facility coupled to said knowledge base for maintaining and updating said knowledge base, and data entry and display means coupled to said inference engine for communicating and receiving commands therefrom for operating said expert system, said method of comprising the steps of:
   connecting an end user interface facility module as an interface between said data entry and display means and said inference engine for controlling the operation of said expert system;
   connecting an expert user interface facility module as an interface between development facility and said knowledge base;
   interconnecting said expert user interface facility module to said end user interface facility by control means;
   stopping at each field item of each form frame displayed by said end user interface facility module when placed in an edit mode by said control means in response to signals from said expert user interface facility module;
   generating and displaying a plurality of choice items for selection in response to a predetermined data entry input by said end user interface facility module when being operated in said edit mode in response to signals from said inference engine based on the context of the operation being performed; and,
   switching control from said end user interface facility module to said expert user facility module as a function of a selection of one of said plurality of choice items for displaying the selected item within said knowledge base to be edited under the control of said expert user interface facility module thereby facilitating updating and maintenance.

13. The method of claim 12 wherein said connecting and displaying step includes the steps of:
   (a) identifying said form and said field item being operated on prior to said predetermined data entry input and storing values representative of said form and field item in a stack memory area of said memory;
   (b) identifying said frame and said slot associated with said form and field item through inheritance and storing values representative of said frame and said slot in said stack memory area; and
   (c) identifying any list of choices associated with any facet of said form and field item through inheritance and storing values representative of said list of choices in said stack memory area.

14. The method of claim 13 wherein said connecting and displaying step further includes the steps of:
   accessing said stack memory area;
   processing each store item to produce a number of stored values; and,
   displaying each of said stored values as choice items.

15. The method of claim 14 wherein said step of displaying said stored values include a number of the following steps based upon said context of said operation being performed:
   displaying a name designating a frame;
   displaying a name designating a slot of a frame;
   displaying a name designating a facet of a slot of a frame;
   displaying a name designating any ruleset related to a facet of a slot of a frame;
   displaying a name designating said form, and
   displaying a name designating an item-list ruleset of said form.

16. The method of claim 14 wherein said following steps further include the step of:
   displaying an exit choice for enabling to continue to simulate said end user operation under control of said end user interface facility module.

* * * * *